United States Patent

Erdahl et al.

[15] 3,665,408

[45] May 23, 1972

[54] ELECTRONICALLY-GENERATED PERSPECTIVE IMAGES

[72] Inventors: Alan C. Erdahl; David C. Evans, both of Salt Lake City, Utah

[73] Assignee: University of Utah

[22] Filed: May 26, 1970

[21] Appl. No.: 40,647

[52] U.S. Cl. ....................................340/172.5, 340/324 A

[51] Int. Cl. ....................................................G06f 3/14

[58] Field of Search.................340/172.5, 324 A; 315/18, 22

[56] References Cited

UNITED STATES PATENTS

| | | | |
|---|---|---|---|
| 3,529,298 | 9/1970 | Lourie | 340/172.5 |
| 3,539,860 | 11/1970 | Max et al. | 340/324 X |
| 3,527,980 | 9/1970 | Robichaud et al. | 315/22 |
| 3,473,082 | 10/1969 | Kolodnyckij | 340/324 X |
| 3,441,789 | 4/1969 | Harrison | 340/324 X |
| 3,531,775 | 9/1970 | Yasuo Ishii | 340/172.5 |
| 3,501,746 | 3/1970 | Vosbury | 340/172.5 |
| 3,346,853 | 10/1967 | Koster et al. | 340/172.5 |

*Primary Examiner*—Paul J. Henon
*Assistant Examiner*—Sydney R. Chirlin
*Attorney*—Lynn G. Foster

[57] ABSTRACT

A method and system for generating point intensity control signals for producing complex images on an electronic display device. The image to be displayed is defined by data specifying bounded areas of the viewing screen of the display device together with an intensity function for that area. This data is fed in the order in which the bounded areas first appear in the scanning pattern of the display, utilized to generate point intensity control signals then updated for future use and stored in order. The appropriate data for each portion of the viewing screen is chosen from either the stored data or newly received data. A plurality of intensity functions may be specified by the data to provide images with constant linear and nonlinear intensities or any combinations thereof. In addition, provision is made for providing lines and overwriting the image.

54 Claims, 22 Drawing Figures

INVENTORS.
ALAN C. ERDAHL
DAVID C. EVANS
BY Lynn G. Foster
ATTORNEY

INVENTORS.
ALAN C. ERDAHL
DAVID C. EVANS
BY Lynn G. Foster
ATTORNEY

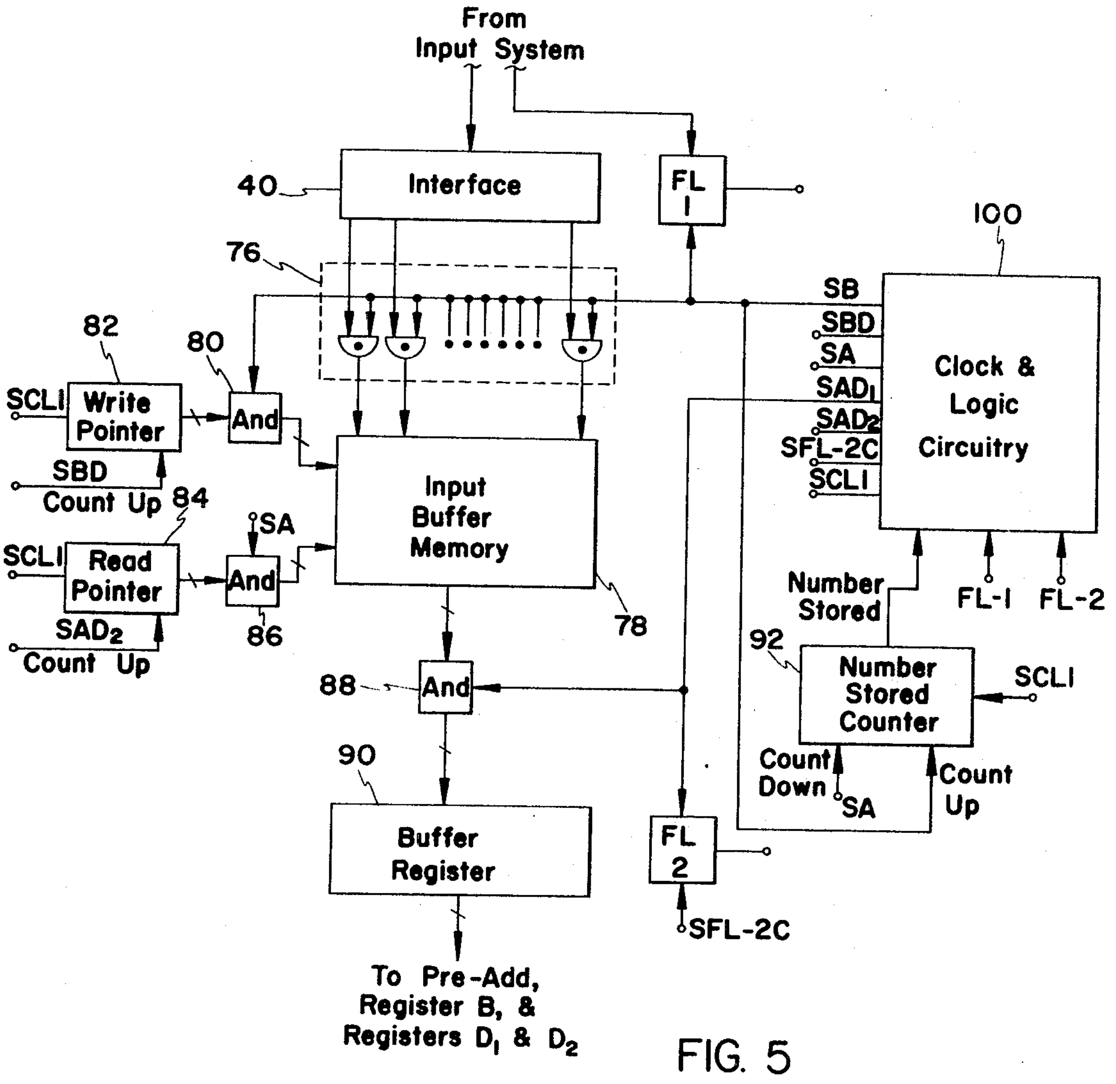

FIG. 5

TABLE 5

SA = Cycle A • $\overline{\text{Empty}}$•($\overline{\text{fl-2}}$ + SK)

$SAD_1$ = SA Delayed $SAD_2$ = $SAD_1$ Delayed

SB = Cycle A•fl-1•$\overline{\text{Full}}$•(Empty+(fl-2•$\overline{\text{SK}}$))

SBD = SB Delayed

Empty = No. Stored is Zero

Full = No. Stored equals size of Input Buffer Memory

SCLI = System Clear (manual push button)

SFL-2C = SCLI + ($\overline{SAD_1}$•[SC + SD + SP + SR])

INVENTORS.
ALAN C. ERDAHL
DAVID C. EVANS

BY Lynn S. Foster

ATTORNEY

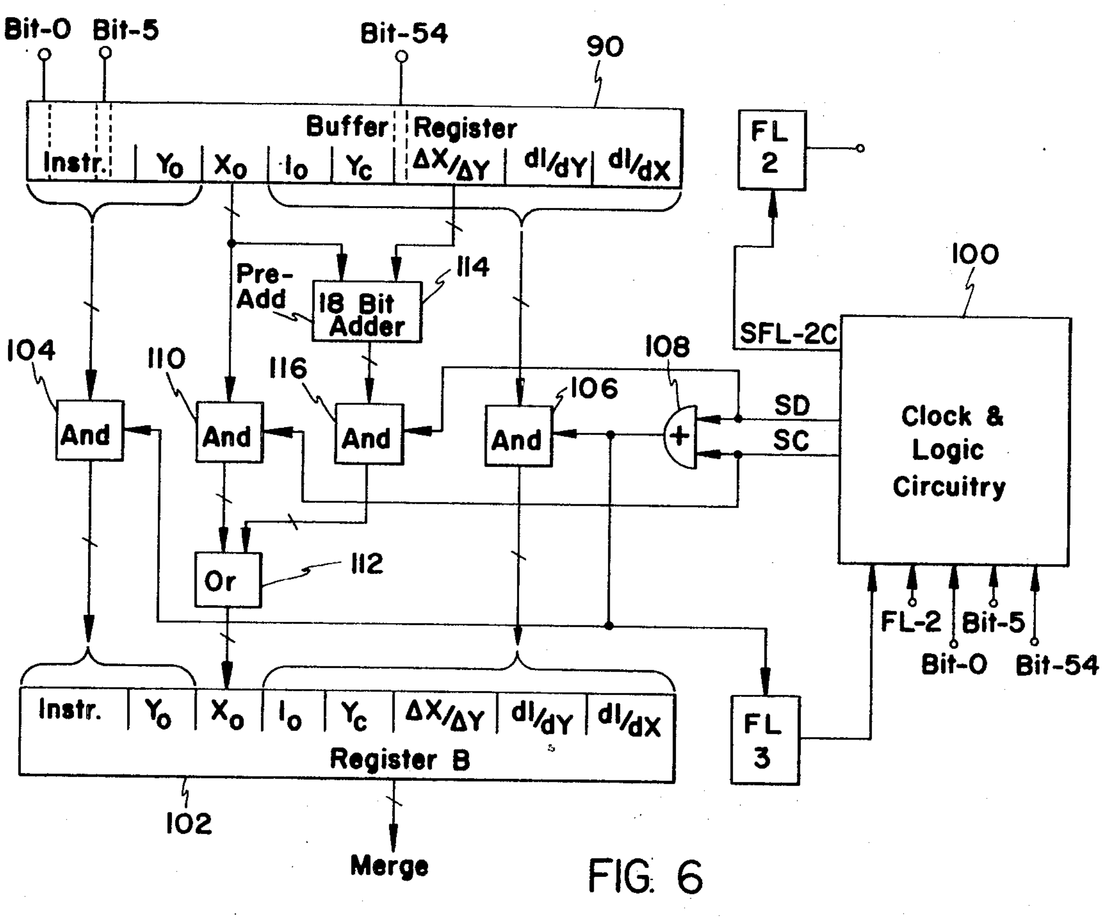

FIG. 6

TABLE 6

$SC = Cycle\ A \cdot FL\text{-}2 \cdot (\overline{FL\text{-}3} + SK) \cdot Bit\text{-}0_{B.R.} \cdot (Bit\text{-}5_{B.R.} + \overline{Bit\text{-}54_{B.R.}})$ $SD = Cycle\ A \cdot FL\text{-}2 \cdot (\overline{FL\text{-}3} + SK) \cdot Bit\text{-}0_{B.R.} \cdot (\overline{Bit\text{-}5_{B.R.}} \cdot Bit\text{-}54_{B.R.})$ $SFL\text{-}2C = SCLI + (\overline{SAD_I} \cdot [SC + SD + SP + SR])$

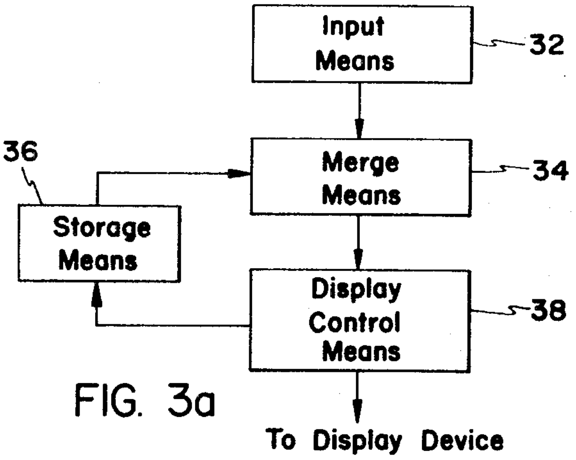

FIG. 3a

INVENTORS.
ALAN C. ERDAHL
DAVID C. EVANS
BY Lynn G. Foster
ATTORNEY

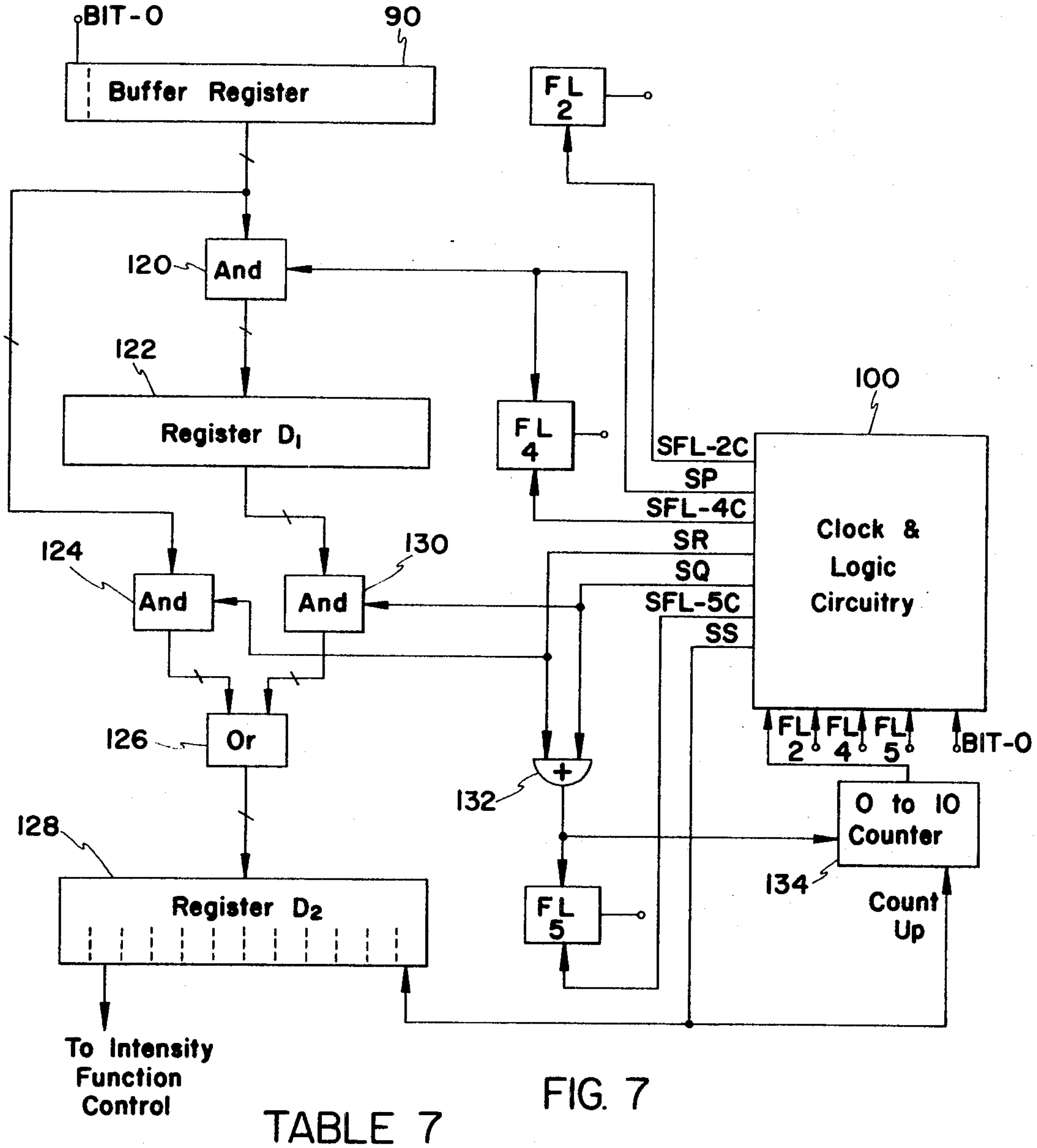

FIG. 7

TABLE 7

$SP = \text{Cycle } A \cdot fl\text{-}2 \cdot \overline{Bit\text{-}0_{B.R.}} \cdot ((fl\text{-}4 \cdot Lxt) + (\overline{fl\text{-}4} \cdot fl\text{-}5 \cdot \overline{Lxt}))$ $SR = \text{Cycle } A \cdot fl\text{-}2 \cdot \overline{Bit\text{-}0_{B.R.}} \cdot ((\overline{fl\text{-}5} + (\overline{fl\text{-}4} \cdot Lxt))$ $SQ = \text{Cycle } A \cdot fl\text{-}4 \cdot Lxt$ $SS = \text{Cycle } A \cdot fl\text{-}5 \cdot RIP \cdot \overline{Lxt}$ $SFL\text{-}4C = SCLI + (SQ \cdot \overline{SP})$ $SFL\text{-}5C = RST + (\text{Cycle } A \cdot Lxt \cdot \overline{SQ} \cdot \overline{SR})$ $Lxt = \text{Shift No.} = 10$ RIP = Request for intensity value from Mode Control $RST = SLCI + (\text{Shift No.} \neq 0 \cdot SJ)$ $\text{ErrorI} = RIP \cdot \overline{fl\text{-}5}$

INVENTORS.
ALAN C. ERDAHL
DAVID C. EVANS

BY Lynn G. Foster
ATTORNEY

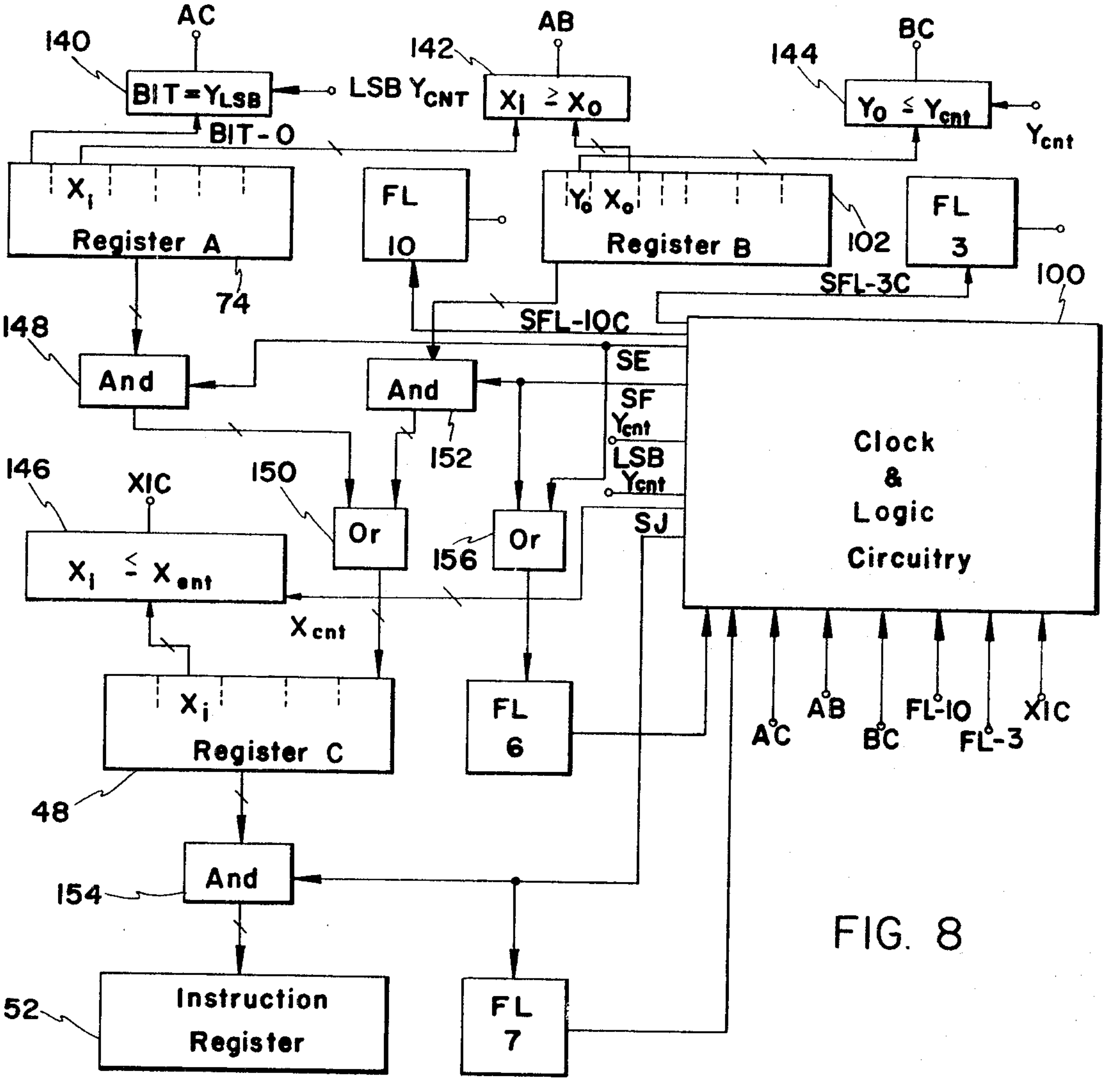

FIG. 8

TABLE 8

SE = Cycle A · fl-10 · AC · ($\overline{BC}$ + $\overline{AB}$) · $\overline{STPMRG}$ · (XIC + $\overline{fl-6}$)

SF = Cycle A · fl-3 · BC · ($\overline{AC}$ + AB) · $\overline{STPMRG}$ · (XIC + $\overline{fl-6}$)

SJ = Cycle A · fl-6 · XIC

SK = fl-3 · BC · ($\overline{AC}$ + AB) · $\overline{STPMRG}$ · (XIC + $\overline{fl-6}$)

STPMRG = $\overline{fl-3}$ · SW5

Sfl-3c = SCLI + (SF · $\overline{fl-2}$)

Sfl-10c = SCLI + (SE · Empty A)

Sfl-6c = SCLI + (SJ · $\overline{SE}$ · $\overline{SF}$)

$X_{CNT.}$ = X scan position counter (X out)

$Y_{CNT.}$ = Y scan position counter (Y out)

INVENTORS.
ALAN C. ERDAHL
DAVID C. EVANS

BY [signature]

ATTORNEY

TABLE 12

$S_{add} = \text{Cycle A} \cdot (\overline{fl-8} + \overline{\text{Mode } 010}) \cdot \overline{Flgs}$ $ST = \text{Cycle B} \cdot \text{Mode } 010 \cdot fl-7$ $SM = \text{Cycle B} \cdot fl-7$ $SN = \text{Cycle B} \cdot fl-8 \cdot Ynz$ $Sfl\text{-}7c = SCLI + SM$ $Sfl\text{-}8c = SCLI + (SN \cdot \overline{fl-7})$

TABLE 9

INVENTORS.
ALAN C. ERDAHL
DAVID C. EVANS

BY Lynn G. Foster

ATTORNEY

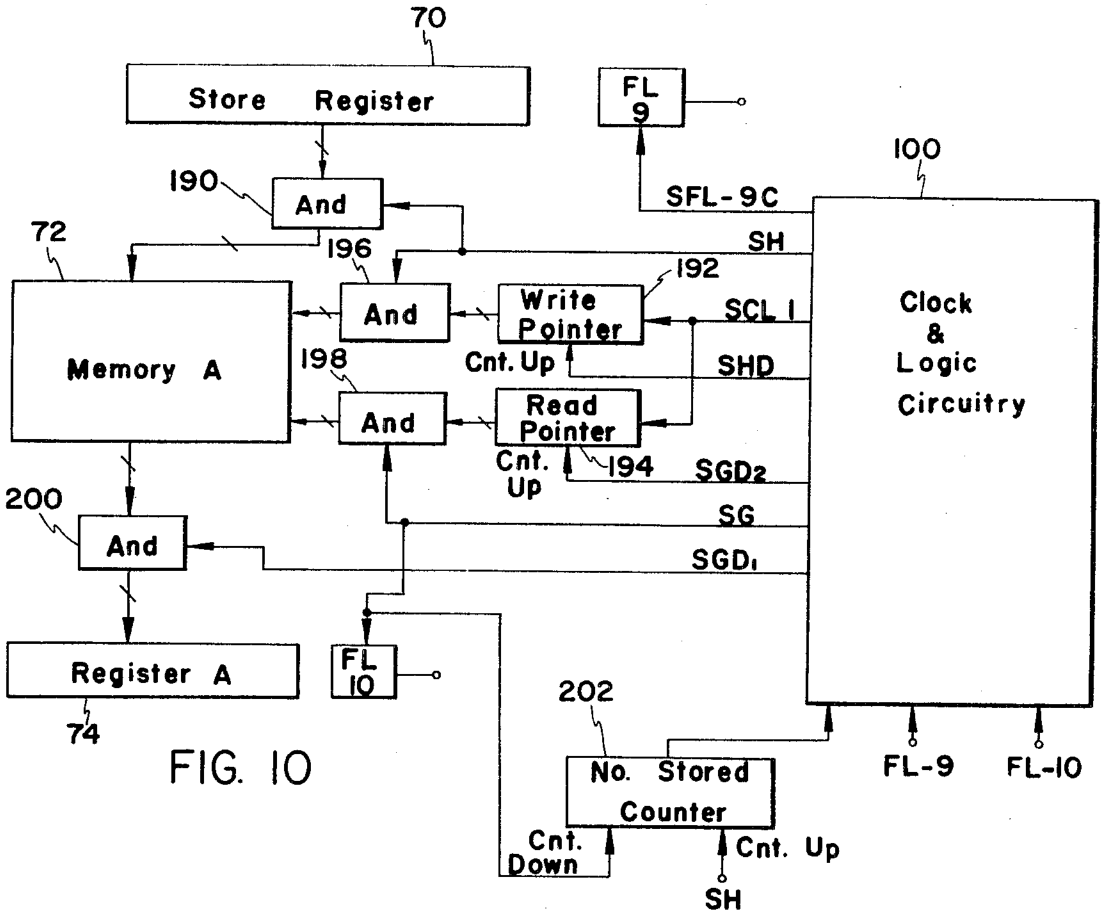

FIG. 10

TABLE 10

SG = Cycle A $\cdot$ $\overline{\text{Empty A}}$ $\cdot$ ($\overline{\text{fl-10}}$ + SE)

$SGD_1$ = SG delayed $SGD_2$ = $SGD_1$ delayed

SH = Cycle B $\cdot$ fl-9 $\cdot$ $\overline{\text{Full A}}$

SHD = SH delayed

Sfl-9c = SCL1 + (SH $\cdot$ $\overline{\text{SN}}$)

Empty A = # Stored equals zero

Full A = # Stored equals the size of Memory A

Error 2 = Cycle B $\cdot$ fl-9 $\cdot$ Full A

INVENTORS.
ALAN C. ERDAHL
DAVID C. EVANS
BY [signature]
ATTORNEY

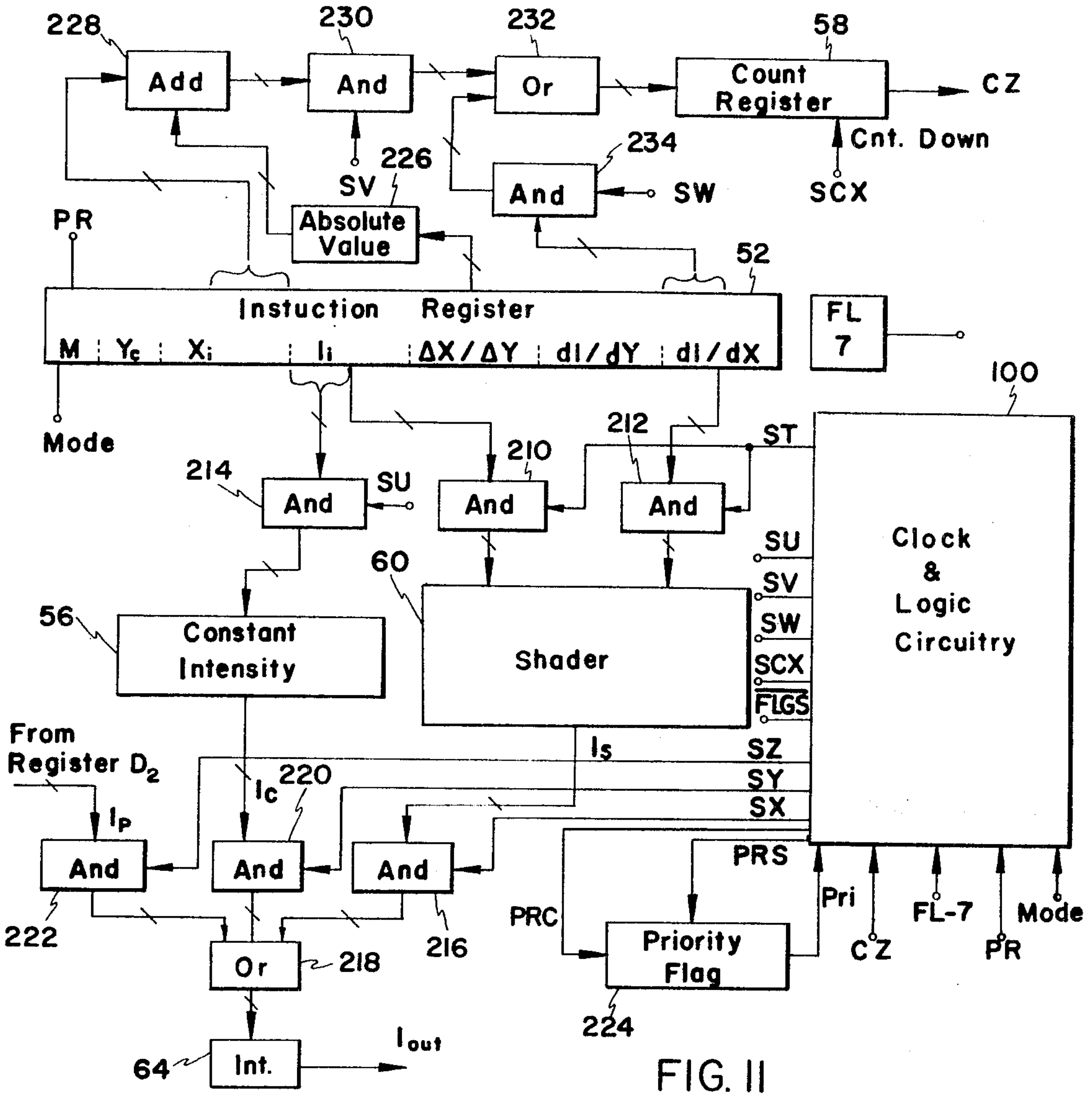

FIG. 11

TABLE II

ST = Cycle B · Mode 010 · fl-7
SU = Cycle B · fl-7 · $\overline{\text{Pri}}$
SV = Mode 001 · Cycle A · fl-8
SW = Cycle B · Mode 101 · fl-7
SX = Cycle A · ((Mode 01X · $\overline{\text{Pri}}$) + (Mode 101 · CZ)) · $\overline{\text{Flgs}}$
SY = Cycle A · (Pri + Mode 100 + (Mode 101 · $\overline{\text{CZ}}$) + (Mode 001 · $\overline{\text{CZ}}$)) · $\overline{\text{Flgs}}$
SZ = Cycle A · Mode 110 · $\overline{\text{Pri}}$ · Flgs
SCX = Cycle A · $\overline{\text{CZ}}$ · $\overline{\text{Flgs}}$
CZ = equals 1 if Count Reg. equals zero
PRS = fl-7 · Cycle B · PR
PRC = SCL1 + (CZ · Cycle A)
RIP = Cycle A · Mode 110
FLGS = STP + Xsync + Y sinc + Error
STPS = Mode 111 · fl-7
Errors = Error 1 + Errors 2 + STPMRG INVENTORS.
ALAN C. ERDAHL
DAVID C. EVANS
BY Lynn G. Foster
ATTORNEY INVENTORS.
ALAN C. ERDAHL
DAVID C. EVANS
BY Lynn G. Foster
ATTORNEY INVENTORS.
ALAN C. ERDAHL
DAVID C. EVANS
BY [signature]
ATTORNEY INVENTORS.
ALAN C. ERDAHL
DAVID C. EVANS
BY Lynn G. Foster
ATTORNEY INVENTORS.
ALAN C. ERDAHL
DAVID C. EVANS
BY Lynn G. Foster
ATTORNEY

INVENTORS.
ALAN C. ERDAHL
DAVID C. EVANS

BY Lynn G. Foster
ATTORNEY

ELECTRONICALLY-GENERATED PERSPECTIVE IMAGES

The patentable subject matter was developed under a United States Government contract, and the assignor, University of Utah, does hereby grant and convey to the United States of America, an irrevocable, non-exclusive, and royalty free license to practice, and cause to be practiced for the Government throughout the world, in the manufacture, use, and disposition according to law, of any article or material, and in the use of any method embodying any and all inventions covered by the subject Letters Patent.

The present invention relates to a method and system for controlling display devices and more particularly to a display generator for producing intensity control signals for the generation of complex images. The present invention is particularly well adapted for producing intensity control signals for the generation of shaded perspective images of three dimensional objects in real time and with a significant reduction and simplification of the required data defining what is to be displayed.

Due to the rapidly expanding utilization of automatic digital information processing and retrieval systems, increasing attention has been directed to electronic display devices such as conventional raster scan television type displays as a convenient and efficient communication link between man and machine. As a result of this attention, electronic displays have been increasingly utilized for displaying alphanumeric information and simple geometric images.

With regard to alphanumeric information, much progress has been made since the production of the individual alphanumeric characters may be preset or preprogrammed for call-up as needed.

However, with regard to geometric images, little progress beyond simple line drawings, which are not very informative for complex objects, has been made. This is due primarily to the random function of intensity changes which are necessary to generate more complex images. This is especially true of images which may be desired to appear shaded to enhance the depth perception of the viewer, such as contour maps, architectural drawings and other perspective images. Such shaded images may require intensities which change every point. Since this cannot be preprogrammed it must be done on a point by point basis with an intensity control signal being generated for each point. This necessity for point by point construction with the requirement for the production of an intensity control signal for each point materially increases the automatic processing of the data defining what is to be displayed, thereby rendering most previous systems impractical. This necessity also requires the storage of long lists of display control information which must be supplied to the display control system, thereby requiring a long time for the generation of the desired images.

Various attempts have been made to provide a practical solution to avoid the complexity required by the point by point generation of the image. For example, shaded perspective images have been generated by filling in simple line drawing perspectives with a plurality of parallel lines, the density of the lines being varied to effect shading. This method, however, still requires long lists of intensity control data and a long time for generating the image, while sacrificing the quality of the image.

One practical approach has been developed in connection with the generation of shaded perspective images. This approach is disclosed in the U.S. applications of Romney et al., Ser. No. 802,702, filed Nov. 13, 1968, and Warnock, Ser. No. 825,904, filed May 19, 1969, now U.S. Pat. No. 3,602,702, owned by the assignee of the present invention.

In the Romney et al. system, each surface of the object to be displayed is quantized into a plurality of non-intersecting surfaces which in one particular embodiment are planar triangles. These planar triangular surfaces are projected onto a viewplane established according to the desired orientation of the object with respect to a specified viewpoint. The projection of the surfaces on the viewplane is equivalent to the screen of the display and therefore those surfaces that are determined to be visible appear on the display screen as they are projected on the viewplane. With a raster scan display device, this determination is accomplished by first sorting the projected surfaces according to the particular scan lines in which they appear, and then according to the order in which they appear along each scan line. Depth calculations are then made on each surface to determine which of the planar triangles along each scan line are visible. The information provided from this procedure are line segments consisting of parts of each of the visible triangles along a scan line. To generate a shaded perspective image on a display device, the line segments and the intensity functions for the particular triangle represented by each segment are utilized to generate appropriate control signals for generating a shaded perspective image on a display device. Intensity parameters for defining a linear shading function are calculated for each triangle and then utilized to determine both the initial intensity of the beginning of each horizontal scan line segment and the incremental change along the scan line until the next segment is encountered. Constant intensity functions may be provided by making the selected parameters equal to zero.

The Warnock system utilizes a different approach from that of the Romney et al. system. In the Warnock system, the object to be displayed is defined by surfaces which may conveniently be planar polygons which may intersect. These polygons are projected onto a viewplane established according to a specified viewpoint. The polygons which are visible according to the orientation of the object are determined by looking at progressively smaller subdivisions of the viewplane or viewing screen on which the image of the object theoretically appears, as previously explained with respect to the Romney et al. system. Essentially, Warnock uses the approach of taking a difficult problem and dividing it into a plurality of simpler ones. If an object is too difficult to determine which polygons are visible, then the viewing screen is subdivided and each subdivision is then considered separately. This subdividing continues until either the polygons within it are simple enough to determine which are visible or the resolution limit of the display is reached. More specifically, in one embodiment the subdividing continues until either a single polygon completely occupies the subdivision being considered and is in front of all other polygons appearing within the subdivision or the resolution limit of the display device has been reached. Alternatively, the total number of subdivisions may be reduced by stopping the subdivision process when only two polygons or one polygon at the edge of the object occupy the subdivision being considered if only a single straight line boundary exists between the two visible areas within the subdivision. This subdivision process produces data consisting of the location of the resultant subdivisions and the polygons determined to be visible therein. The Warnock system utilizes display apparatus similar to that of the Romney et al. system.

Thus, both the Romney et al. and Warnock systems reduce the complexity of generating point by point intensity control signals by reducing the necessary information to line segments and a linear or constant intensity function therefor. This still, however, requires a long list of display data since many segments will be present in complex images with the number increasing with the complexity of the image.

The present invention provides a method and system whereby the long lists of intensity control data may be significantly reduced and simplified by defining the image to be displayed by finite bounded areas of the display device viewing screen, together with an intensity function for generating point intensity control signals. The present invention provides a method and apparatus for receiving such bounded area information and for generating the point by point intensity control signals sufficiently fast to allow the generation of the image in real time.

To allow the production of complex images which may require a variety of intensity functions, a plurality of intensity function generators are included in the present invention.

These intensity function generators are selectively actuated by the intensity function data included with each bounded area.

These advantages and features are accomplished by the present invention by a novel method and system in which bounded areas of the image to be displayed, together with the intensity function therefor are defined in terms of the scanning pattern of the display. This information which will hereinafter be referred to as the boundary definitions are supplied to the present invention in the order in which they first appear in the scanning pattern of the display device. These boundary definitions are selected as appropriate for each scan line according to the bounded area defined, and the intensity function specified is utilized to generate point intensity control signals for points along that scan line which are fed to a display device. Once selected, the boundary definitions are tested to determine whether the bounded area defined has been completed and if so, discarded. If not, they are updated and stored for future use in generating intensity control signals for subsequent scan lines. The selection of the appropriate boundary definition for the portion of the image next to be generated is made between the newly received boundary definition and those which have been updated and stored.

The intensity control signals are generated according to one of several intensity functions which may be specified by the boundary definition. In the preferred embodiment provision is made for handling linear, non-linear and constant intensity functions.

The linear and non-linear intensity functions may be utilized to create shaded images to enhance the depth perception of the observer. The constant intensity function may be utilized to permit the overwriting of symbols, lines or a second image on a principal image. It may also be used to generate constant intensity areas or lines.

With regard to the Romney et al. and Warnock systems, the present invention constitutes an improved method and system for controlling the display device once the visible triangles of the Romney et al. system or the subdivisions of the Warnock system have been determined. In application to both systems, the present invention substantially reduces the processing and calculating heretofore required to generate the image on a display device.

Therefore, it is a general object of the present invention to provide a display method and system capable of generating complex images on a display device.

It is another object of the present invention to provide a display control method and system in which the list of display information necessary to produce images is significantly reduced.

It is still another object of the present invention to provide a display control method and system in which complex images may be generated in real time.

It is a further object of the present invention to provide a display control method and system in which intensity control signals can be generated according to a variety of intensity functions.

A still further object of the present invention is to provide a display control method and system which can generate shaded perspective images of complex three-dimensional objects.

It is another object of the present invention to provide a display generator method and system which substantially simplified the required display information.

It is still another object of the present invention to provide a display generator method and system which is capable of generating point intensity control signals for controlling a display device from information specifying an area of the display screen and the intensity function therefor.

The above objects and advantages as well as others of the present invention will be readily apparent to one skilled in the art to which the invention pertains from a perusal of the claims and the following detailed description when read in conjunction with the appended drawings.

BRIEF DESCRIPTION OF THE DRAWINGS

FIG. 3*a* is a block diagram of the present invention.

FIG. 5 is a schematic diagram of an embodiment of the input means and more specifically the input buffer.

FIG. 6 is a schematic diagram of an embodiment of the interconnection of the buffer register pre-add and register B.

FIG. 7 is a schematic diagram of an embodiment of registers D1 and D2.

FIG. 8 is a schematic diagram of an embodiment of the merge means and more specifically the merge, register C and the instruction register.

FIG. 10 is a schematic diagram of an embodiment of the store register, memory A and register A.

FIG. 11 is a schematic diagram of an embodiment of the intensity function control.

Tables 5–12 are related to FIGS. 5–12 and set forth the logic equations necessary to generate the transfer and control signals in each of the schematic diagrams respectively.

FIGS. 13, 14, 15 and 16 are schematic diagrams of the logic circuit of the clock and logic circuitry of FIGS. 5–12 necessary to generate the transfer and control signals set forth in Tables 5–12.

Figures 16, 17, 19:
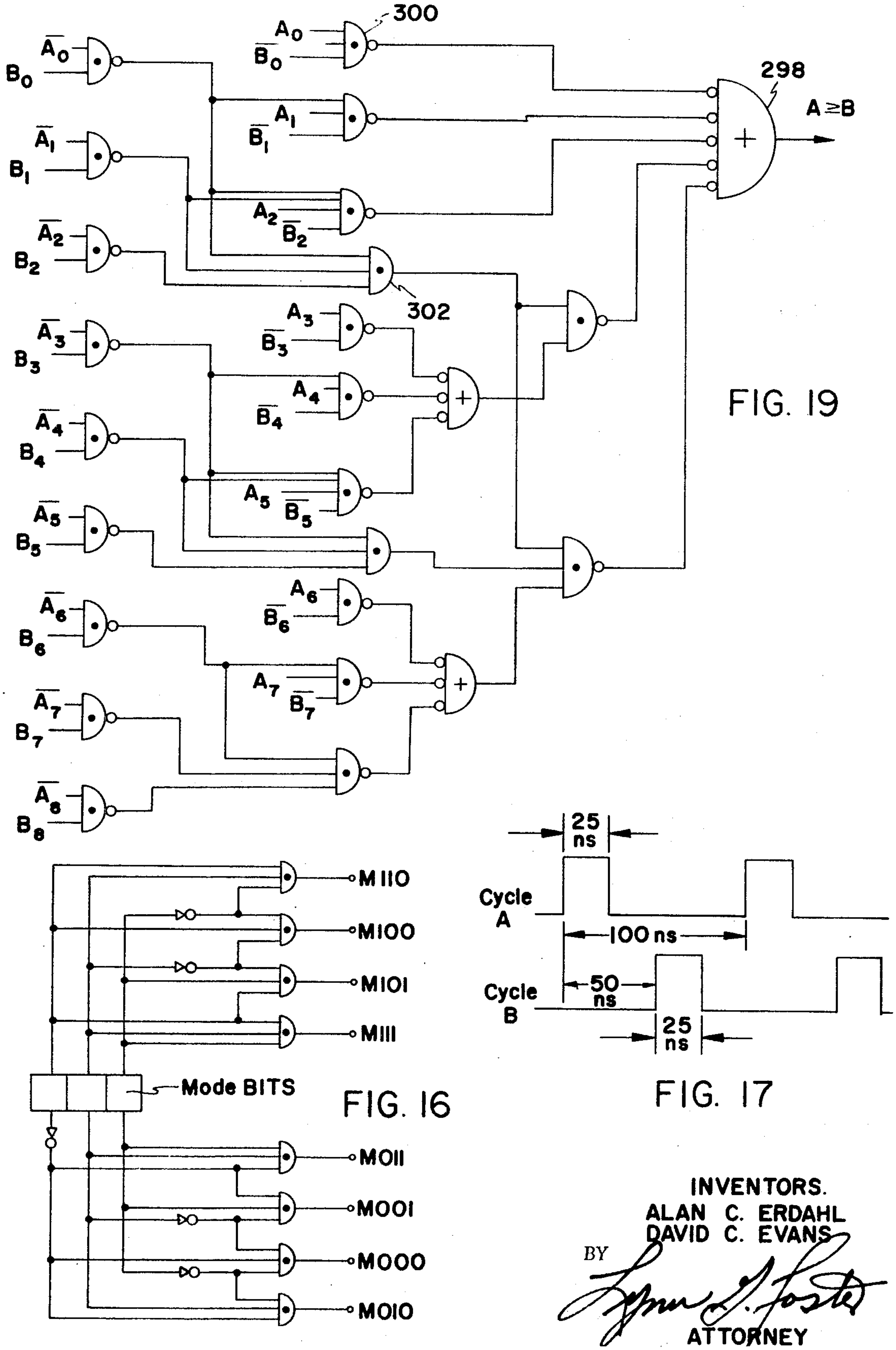

FIG. 17 is a graphical representation of the timing cycles of the clock utilized in the present invention.

Figure 18:
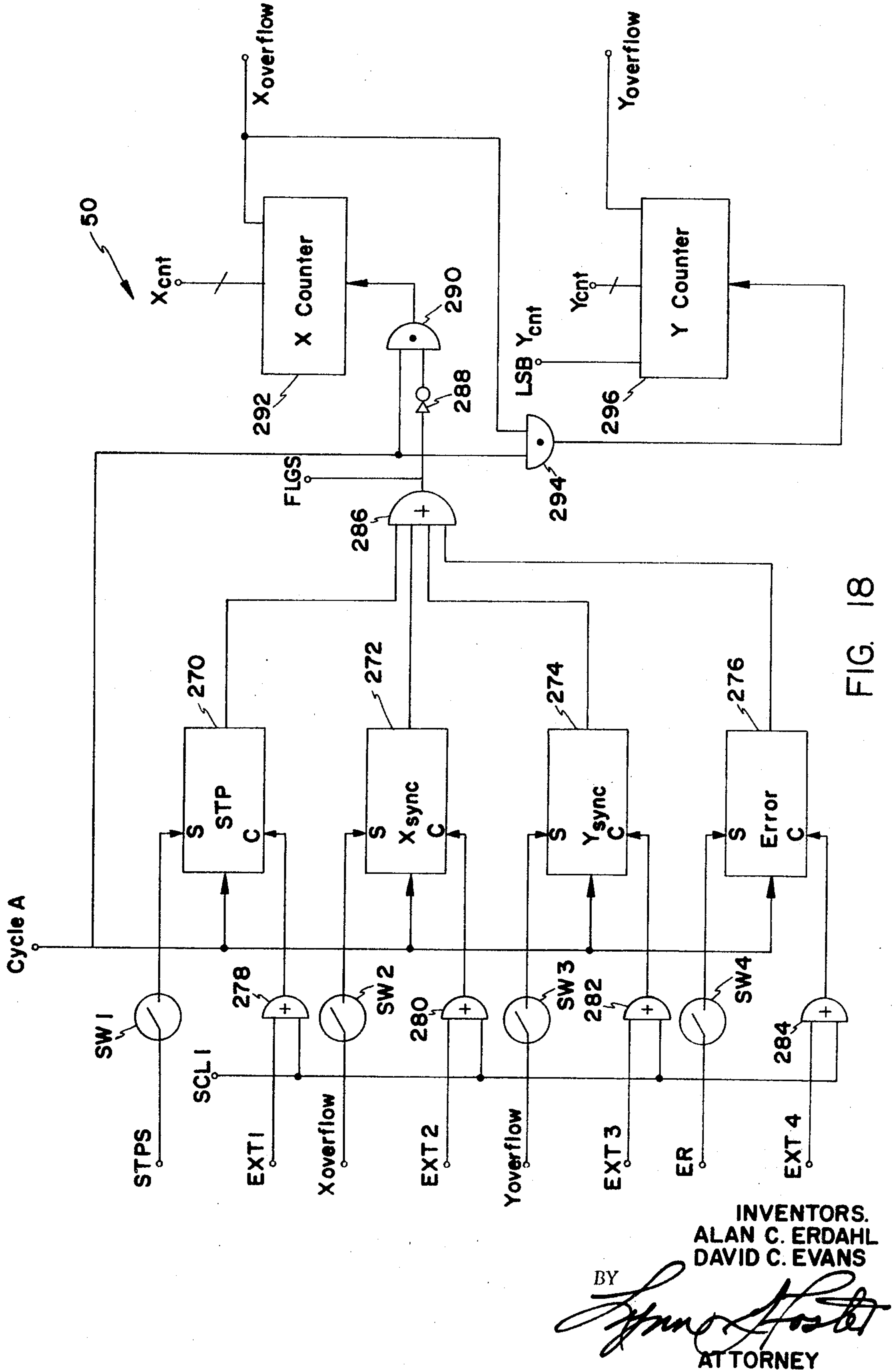

FIG. 18 is a schematic diagram of the clock control and syncronization circuit of the clock and logic circuitry of FIGS. 5–12.

FIG. 19 is a schematic diagram of an embodiment of a nine-bit comparator circuit which may be utilized in he present invention.

Figures 1, 3B:
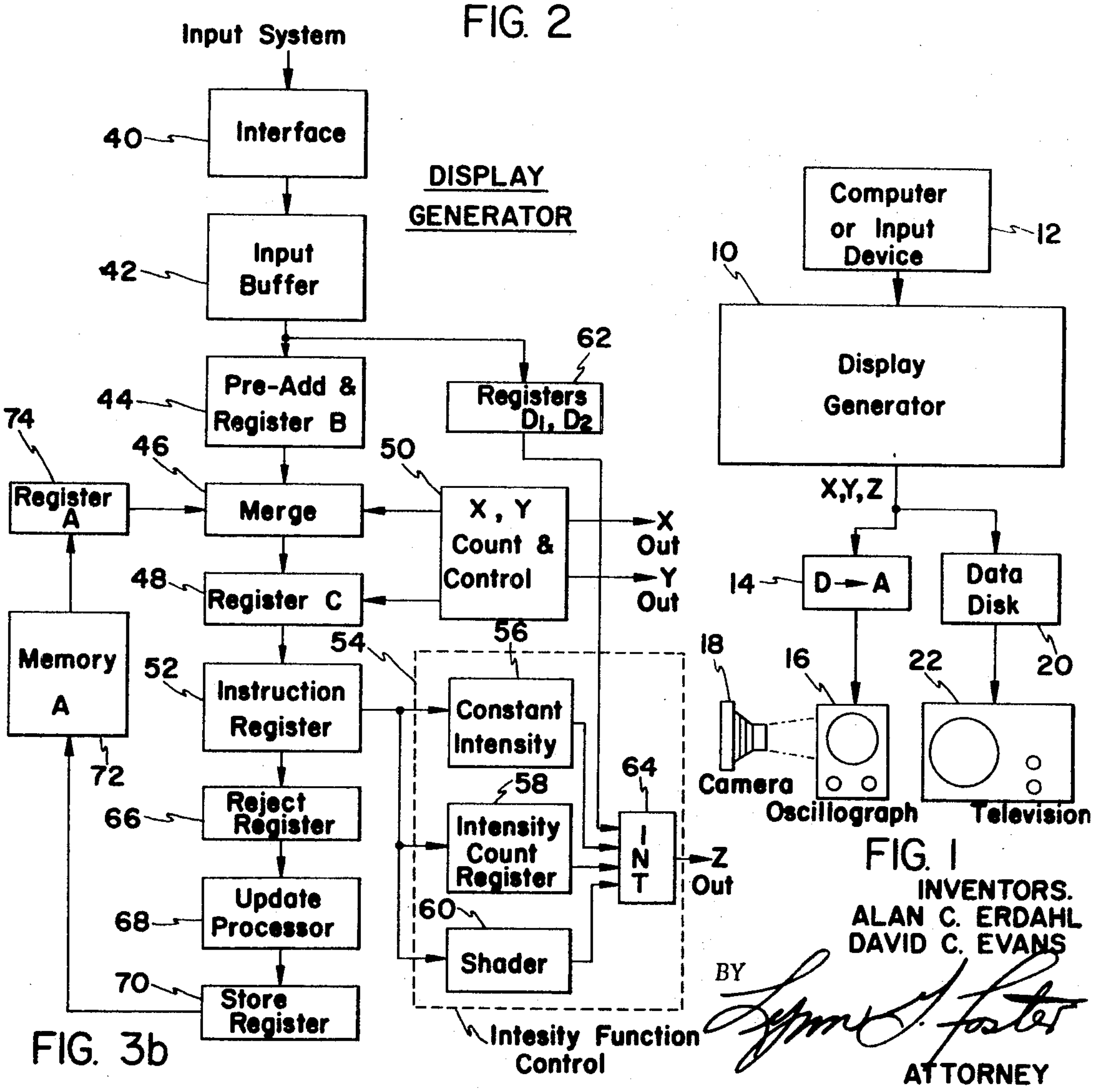
FIG. 1 is a block diagram of the present invention in a total system for generating a display image.
FIG. 3*b* is a more detailed block diagram of a preferred embodiment of the present invention.

Referring to FIG. 1, a block diagram of an overall display system from generation of data to displaying of an image is shown incorporating the present invention. More specifically, the display generator 10 of the present invention is connected to a computer or input device 12 which supplies boundary definitions defining the image to be displayed thereto. The output signal from the display generator 10 may be connected to a digital to analog converter 14 which converts the signal to an analog signal and supplies it to an oscillograph 16 by which the image may be generated by utilizing a time-delay camera 18. Alternatively, the signal may preferably be supplied to a data disk 20 which constantly refreshes the image on a conventional television receiver 22.

Operatively, digital signals representative of the boundary definitions are generated by the computer or input device 12 and supplied to the display generator 10. The boundary definitions are then processed by the display generator 10 to generate intensity control signals for each part in the order in which they appear in the scanning pattern of the particular display device utilized.

As discussed above, the display generator 10 of the present invention may be utilized in the overall system of FIG. 1 to generate point intensity signals to produce various types of complex images on electronic displays.

Since the most commonly available display device is a conventional television receiver, the preferred embodiment will be described in detail hereafter as being specifically adapted for such a display.

A conventional television receiver utilizes a raster scanning pattern having a plurality of horizontal scan lines spaced vertically along the viewing screen with a plurality of points along each scan line. The conventional path followed by the electron beam of such displays is from top to bottom and from left to right. Also as conventional, the position of any point on the viewing screen is identified by the scan line, Y, and the position along that scan line, X. The intensity of the electron beam is also conventionally designated, Z. Thus, in FIG. 1 the point intensity control signals from the display generator are designated as X, Y, Z.

With the raster scanning pattern the bounded area to which the boundary definitions pertain may be easily specified by defining only the first encountered boundary thereof, since the next occurring bounded area will define the extent of that first bounded area. Furthermore, since the electron beam follows horizontal scan lines, no top or bottom edge need be defined as they will be inherently produced.

To more clearly understand this method of defining bounded areas reference will now be made to FIG. 2, which is a diagrammatic illustration of an image produced on a display device screen 24. For simplicity the object consists of three overlapping planar triangles 26, 28 and 30. All of the bounded areas needed to produce this image are identified by the first appearing boundary edge of each B1–B14. Note that the background of the image itself is defined as bounded areas by the boundary edges B1, B3, B5, B7, B11 and B13. As apparent from FIG. 2, each bounded area is completely defined by specifying only the first appearing boundary edge with the extent of the bounded area limited by the boundary edge of the next appearing bounded area.

These boundary edges may be easily defined by specifying the initial point at which the boundary edge enters (Xo, Yo), the equation of the line to define the entry points of the edge for successive scan lines and the number of scan lines in which the edge appears (Yc). Where the edge is a straight line the equation of the line is simply the slope of the line. For convenience of processing this is more easily handled by specifying the inverse slope ($\Delta X/\Delta Y$).

For each boundary edge the intensity function associated therewith must also be specified. As stated previously, he present invention provides three different functions, namely linear, non-linear and constant. These functions may be specified by giving the initial intensity (Io) at the initial point of the boundary edge (Xo, Yo) and the equation for the change in intensity. For a raster scanning pattern the linear intensity function may be specified as the rate of change of intensity along each scan line (dI/dX) and the rate of change of intensity between scan lines (dI/dY). Either one can be set to zero if desired and for constant intensity over a large area both may be set to zero and the initial intensity value (Io) will be produced for all points in that area.

The constant intensity function may also be used to provide an overwrite function for drawing lines. Horizontal lines may, of course, be specified by merely defining a boundary edge of a single scan line thickness. However, to provide a line which may cross boundary edges for overwrite purposes, the length of the line desired must be specified so that the next boundary definition does not change the intensity function until the line is completely generated.

For horizontal lines this length may be specified by a simple count number specifying the number of points to be so intensified. For other than horizontal lines, a different procedure must be utilized. One method which has been found adequate for lines of all slopes, both positive and negative, is to intensify all points through which the line passes. For each scan line through which the line passes these points may be determined by the following equation:

$$\text{No. of Points} = \text{Int.}\ (X_{ifr.} + |\Delta X/\Delta Y| + 1) \qquad (1)$$

where $Xi$ is the beginning point of the line along any scan line and $X_{ifr.}$ is the fractional part of $Xi$.

Non-linear intensities can only be specified by providing individual intensity values for each point in the boundary. This is done by providing data words containing the individual intensity values in the order in which they appear in the scanning pattern.

As stated previously, one of the most important applications of the present invention is to generate intensity control signals for producing shaded perspective images of complex three dimensional objects. Since the methods and systems disclosed in the Romney et al. and Warnock applications described above are the most efficient and accurate ways to generate data defining such images presently known, the preferred embodiment of the present invention is specifically adapted to generate point intensity control signals from the Romney et al. or Warnock produced data.

Specifically, in its application to the Romney et al. system, the boundary definition would define the leftmost edge of each visible triangle by the initial point (Xo, Yo) the inverse slope of the edge ($\Delta X/\ \Delta Y$) and the number of scan lines crossed by the edge (Yc).

The boundary definition would also include the initial intensity level (Io) at the initial point of the edge. If a linear intensity function is to be defined, then the incremental change in intensity with respect to both $X$ and $Y$ (dI/dX, dI/dY) will be specified. If a nonlinear function is to be defined, then each point on the display will be specified by an arbitrary value, which values are packed into data words following the boundary definition. If a constant intensity is desired for a particular surface, then the changes in intensity with respect to the $X$ and $Y$ coordinates may be set to zero. If a constant intensity is desired for a line the length of the line may be specified as discussed above.

For use in the Warnock system, the boundary definitions would be the leftmost edges of the finally determined subdivisions and the intensity function of the polygon determined to be visible in that subdivision. The edge and intensity functions would be the same as explained above with respect to the Romney et al. system. In the alternative embodiment of the Warnock system where a subdivision is stopped when only a single line intersects a subdivision, then that line becomes another boundary definition. When the subdivisions are squares, as in the embodiment described in the Warnock patent application, the size of the square determines the number of scan lines which the boundary intersects and in that case the inverse slope of the edges is zero since the edges are vertical.

Thus, in effect, the preferred embodiment of the display generator which will be described in detail hereinafter is generally implemented to handle boundary definitions which are the straight line edges of the visible triangles of the Romney et al. system or the straight line edges of the final subdivisions and possible intersecting straight line boundaries within a subdivision of the Warnock system.

Before describing the preferred embodiment of the present invention in detail the data processing procedure of the present invention will be briefly described for straight line boundary edges and a raster scan display device. As discussed above, the information needed to describe a boundary edge is the initial point (Xo, Yo), the inverse slope ($\Delta X/\Delta Y$) and the number of scan lines in which the boundary edge appears (Yc). Since the electron beam scans across each scan line in order, each boundary edge which crosses that scan line must be considered to produce the intensity control signals for all points along that scan line. Furthermore, once a boundary edge appears in one scan line, it will appear in all successive scan lines until it is terminated. By prohibiting boundary edges from crossing each other, the order of their appearance may be maintained by keeping them in the order in which they first appear in the scanning pattern. For the first scan line in which a boundary edge appears the intensity function associated therewith in the boundary definition controls all points along the scan line from (Xo, Yo) until the next boundary definition appears. The position along successive scan lines at which that intensity function is to begin control (Xi) will change unless the inverse slope is zero. To account for the general case where the edge is not vertical and hence has a slope, then $\Delta X/\Delta Y$ must be added to $X_o$ for control in the next scan line. This updating of the $X$ position must be performed for each successive scan line.

In addition, the initial intensity value Io must also be updated by adding $dI/dY$, where this intensity function is desired, to provide the beginning intensity value Ii for successive scan lines.

To keep track of the length of the boundary edge so that it may be discarded when the area of the image it pertains to is completed, $Y_c$ is reduced by one for each successive use of the boundary definition in successive scan lines. When $Y_c$ is zero then that area is completed and the boundary definition may be discarded.

As stated above, since the boundary edges are prohibited from crossing, the order in which the boundary definition appears in subsequent scan lines is the same as they first appear. Thus, by storing the boundary definitions in the order in which they appear, their order for subsequent control of successive scan lines is maintained.

The present invention utilizes this order of boundary definitions to interweave newly received boundary definitions with previously received boundary definitions so that the correct image is generated. Since the stored boundary definitions and the incoming boundary definitions are in order only the next boundary definition of each group need be checked to determine which is next in the scanning pattern of the display. That is, if the next appearing incoming boundary definition appears before the next appearing previously received boundary definition, then it must appear before all previously received boundary definitions. If the next appearing previously received boundary definition appears before the next appearing incoming boundary definition, it must appear before all incoming boundary definitions.

Furthermore, once a newly received boundary definition is selected it is now in the proper order with respect to other previously received boundary definitions for all subsequent scan lines in which it appears.

Figure 2:
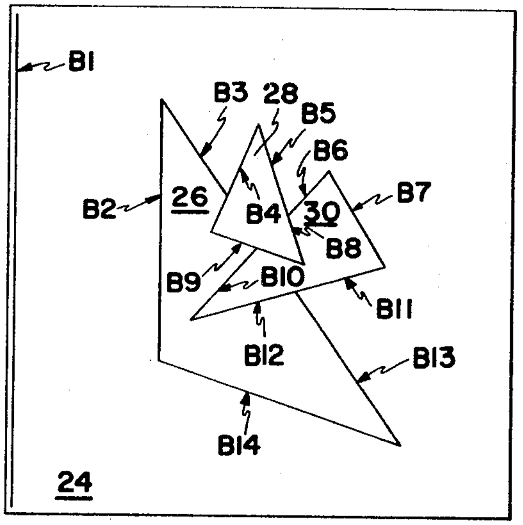
FIG. 2 is a diagrammatic illustration of the type of information utilized in the present invention.

This procedure may be more clearly understood by reference to FIG. 2. The first boundary definition to be received is B1 which essentially defines the background. Boundary definition B1 will be recirculated for each successive scan line until the boundary definition B2 is to appear, which will then control the generation of point intensity control signals until the $X$ position of the boundary definition B3 is reached. While the boundary definition B2 is controlling the generation of intensity control signals, the boundary definition B1 is updated and stored for use in the next scan line. While the boundary definition B3 is controlling the intensity the boundary definition B2 is updated and stored. These three boundary definitions will be recirculated for several scan lines until the scan line in which the boundary definitions B4 and B5 appear in is reached. When this occurs these boundary definitions will be fed in as appropriate with the order maintained.

This procedure continues with boundary definitions B6 and B7 being added when the scan lines in which they appear are reached. The boundary definition B8, although an extension of the boundary definition B5, is specified as a separate boundary definition since the intensity function changes and since boundary edges may not cross. The boundary definition B8 is fed in ahead of the boundary definition B7 and will then be stored for subsequent control before the boundary definition B7. This procedure is continued for the remaining boundary definitions B9–B14 to complete the image being produced.

Thus, by the methods of the present invention the selection of the appropriate boundary definition is reduced to between just two boundary definitions and the need for searching an entire list of boundary definitions is obviated by maintaining the boundary definitions in order.

A preferred embodiment of the present invention which produces point intensity control signals for a raster scanning pattern display device and is adapted to utilize the straight line boundary edges as would be produced by the Romney et al. or Warnock systems will now be described with reference to FIGs. 3*a* and 3*b*.

Referring now to FIG. 3*a*, the display generator 10 (FIG. 1) includes an input means 32 for receiving and holding boundary definitions from the computer or input device 12 of FIG. 1. These boundary definitions are received in the order in which they first appear in the scanning pattern of the display device and are supplied as needed to a merge means 34. The merge means 34 is also connected to receive previously used boundary definitions which have been stored in a storage means 36. The merge means 34 selects the next appearing boundary definition from those previously stored in the storage means 36 and those newly received by the input means 32, and supplies the selected boundary definition to a display control means 38. The display control means 38 responds to the intensity function instructions of the boundary definition to supply point intensity control signals to the D to A converter 14 or the data disk 20 of FIG. 1, and thence to the display device. The boundary definition which is fed to the display control means 38 is also tested to see whether the bounded area to which it pertains has been completed and if not, updated and stored in order in the storage means 36 for subsequent use.

Operatively, the input means receives the boundary definitions in order, stores them and supplies them to the merge means 34 in the order received. The merge means compares the next newly received boundary definition with the next to be considered previously used boundary definition from the storage means 36 and makes the decision as to which appears first in the scanning pattern of the display. The boundary definition which is chosen is fed by the merge means 34 to the display control means 38. The display control means 38 responds to the particular intensity functions specified by the chosen boundary definition and selectively actuates the appropriate intensity function generator to produce the point intensity control signals for controlling the display device.

The boundary definition fed to the display control means is also fed to the storage means 36 where they are stored in the order received for subsequent use. Since the boundary edges do not cross each other they must appear in subsequent scan lines in the order in which they first appeared in the scanning pattern. Before storage each boundary definition is tested by checking the number of scan lines in which it is to appear, $Y_c$, to determine whether the bounded area to which it pertains has been completed. If not, the boundary definitions are updated by subtracting 1 from $Y_c$ and making changes as appropriate in the initial intensity, $I_i$ and the initial starting point, $X_i$ continues until the image is completely generated.

The preferred embodiment of FIG. 3*a* is shown in greater detail in FIG. 3*b*. Referring to FIG. 3*b* the input means 32 includes an interface 40, an input buffer 42 and a pre-add and register B 44. The interface 40 couples the computer input device 12 of FIG. 1 to the display generator and supplies the boundary definitions in the order received to the input buffer 42 which stores the boundary definitions in order. Boundary definitions are then fed as needed to the pre-add and register B 44. The pre-add portion is applicable to negatively sloped boundary definitions as will be explained hereinafter. Register B 44 merely holds the boundary definition next in order for selection by the merge means 34.

The merge means 34 includes a merge 46, register C 48 and an $X$, $Y$ count and control 50. The merge 46 is connected to the register B 44 and to the storage means 36 (FIG. 3*a*). In response to the position of the electron beam in the display device as referenced by the $X$, $Y$ count and control 50, it selects the appropriate boundary definition from either the register B 44 or the storage means 36 (FIG. 3*a*) and supplies that boundary definition to register C 48 where it is held for feeding to the display control means 38 (FIG. 3*a*).

The display control means 38 (FIG. 3*a*) includes an instruction register 52 for holding the boundary definition which is to presently control the generation of point intensity control signals and an intensity function control 54 which generates the point intensity control signals according to the intensity function instructions of the boundary definition. The intensity function control 54 includes a constant intensity function generator 56 for generating areas of constant intensity, an intensity count register 58 for holding the count where constant intensity lines are to be generated and a shader 60 for generating point intensity control signals for linear intensity functions. The display control means 38 also includes registers D1, D2 62 which are directly connected to the input buffer 42 for receiving data words which contain individual point intensity values where a nonlinear intensity function is to be generated. The constant intensity function generator 56, the intensity count register 58, the shader 60 and the registers D1, D2 62 are all connected to an intensity buffer 64 which feeds the digital point intensity control signals to either the D to A converter 14 or the data disk 20 of FIG. 1.

As described previously, the boundary definitions which are fed to the display control means are also fed to the storage means 36 where they are tested, updated and stored for future use. This is accomplished by a reject register 66, an update processor 68, a store register 70, a memory A 72 and a register A 74. After the boundary definitions are fed to the instruction register 52 they are also fed to the reject register 66 where the scan line count Y*c* is tested to determine whether the boundary edge defined therein appears in any further scan lines. If Y*c* is zero, the boundary definition is discarded as the bounded area which it defines has been completed. If it is not zero, then the boundary definition is fed to the update processor 68 where Y*c* is reduced by 1 and the position along the scan line of that boundary edge $X_i$ and the initial intensity along the next scan line $I_i$ are updated for future use. Once updated, the boundary definitions are fed to the store register 70 from which they are then stored in the order received in the memory A 72. The memory A 72 is a first in—first out memory so that the boundary definitions are maintained in the proper order. These boundary definitions are then fed as needed in the order received to the register A 74 where they are held until selected as appropriate by the merge 46.

To more clearly understand the operation of the display generator of FIG. 3B a more thorough understanding of the particular data being operated upon must be had. As mentioned previously, the present preferred embodiment is adapted to be displayed on a raster scan display device such as a conventional television receiver. A typical television receiver will have 512 scan lines with each scan line containing 512 points. Therefore, in a binary system nine bits for each coordinate must be used to define a particular location.

Figure 4A:
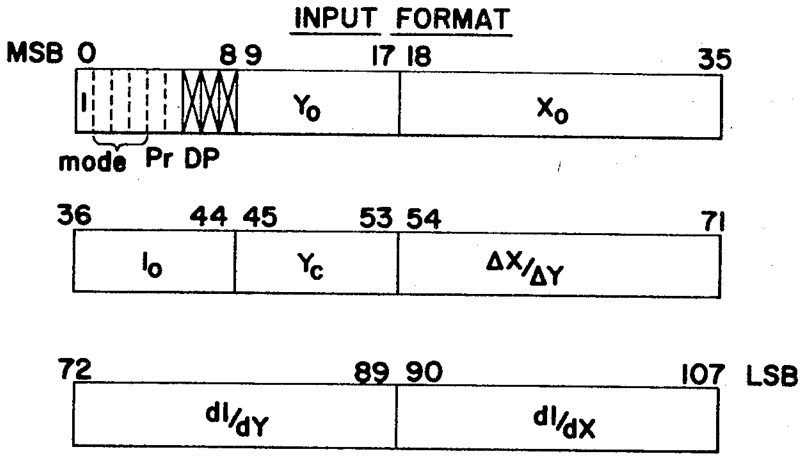
FIGS. 4*a*, 4*b*, and 4*c* are diagrammatic illustrations of the data formats utilized in the preferred embodiment of the present invention for input, control, and non-linear intensity values respectively.

In order to maintain a uniform format the boundary definitions are structured on a multiple of nine. In order to provide room for the initial point X*o*, Y*o*, the initial intensity I*o*, the number of scan lines Y*c*, the inverse slope $\Delta X/\Delta Y$ and the rate of change of intensity with respect to both $X$ and $Y$ for linear intensity functions $dI/dX$ and $dI/dY$, the boundary definition utilized in the preferred embodiment will be 108 bits long and will be set up as shown in FIG. 4*a*. Nine bits are provided for Y*o*, I*o* and Y*c*. In order to provide greater resolution and to avoid truncating errors X*o*, $\Delta X/\Delta Y$, $dI/dY$ and $dI/dX$ are provided with 18 bits each. Nine bits are also provided for instructions which control portions of the processing and specify intensity instructions. More specifically, the instructions include three bits which specify the intensity mode, one bit for priority and one bit to disable the pre-add. The functions of these instructions will be explained in detail hereinafter. These instructions occupy bits 1–3, 4 and 5 respectively. The instruction portion for the input format also includes one bit for indicating whether the word is a boundary definition or a data word. The bit reserved for this function is Bit-0 with a "one" indicating a boundary definition.

Figure 4B:
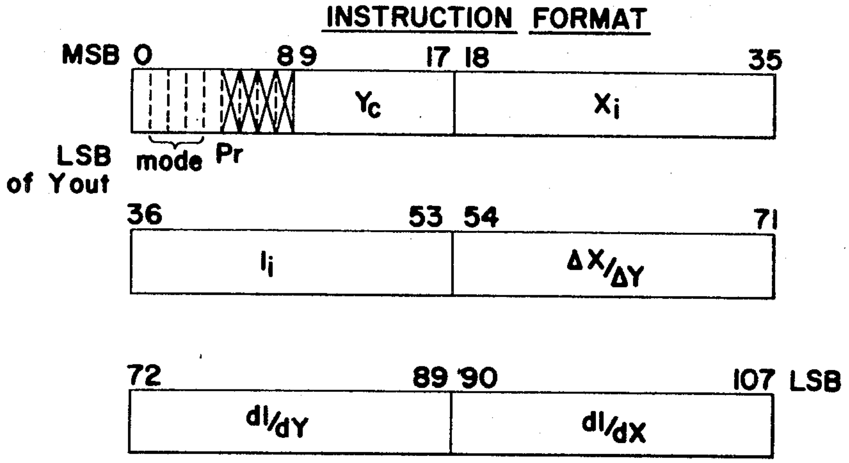
Figure 4C:
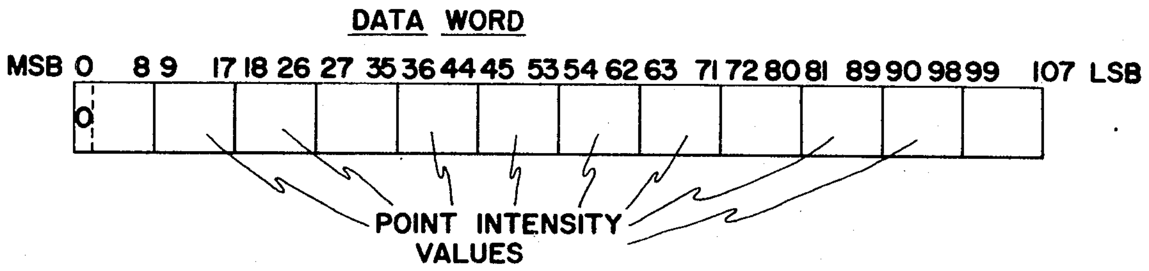

The format shown in FIG. 4*a* is then processed as will be described in detail hereinafter so that the information fed to the instruction register and subsequently stored in memory A is of the format of FIG. 4*b*. In essence, the initial intensity value for any particular scan line $I_i$ is expanded to 18 bits to avoid truncating errors as the original intensity value $I_o$ must be increased by adding $dI/dY$ for the next scan line to be encountered. In order to do this the number of scan lines left in the boundary edge Y*c* is stored where the initial scan line Y*o* was stored since Y*o* is no longer needed once the boundary definition has been selected. A particular scan line is no longer needed since the boundary edge must appear in the next successive scan line as discontinuities are not permitted in boundary edges. Essentially, any discontinuities are accounted for by specifying a new boundary definition. Also, in the instruction portion Bit–0 is used to store the LSB of Y out to keep track of the next scan line in which the boundary appears as will be explained hereinafter. This is in place of the indication in the input format since once the word is determined to be a boundary definition and is fed in the storage loop the indicating bit is no longer needed.

Where a nonlinear intensity function is desired then the individual point intensity values may be provided by data words as shown in FIG. 4*c*. These data words are made up of up to eleven individual values which are fed from the input buffer 42 to registers D1, D2 62. These data words will follow the boundary definition to which they pertain.

With these particular data formats in mind one example of the circuit detail capable of carrying out the preferred embodiment will now be described with reference to the remaining figures. It is noted that other circuit arrangements may be utilized to perform these operations and these will be apparent to those skilled in the art of data processing.

Of these remaining figures, FIGS. 5–12 should be considered with their associated tables of logic equations, Tables 5–12, which describe the transfer and control signals which are generated to operate the system. Circuitry for generating these signals will be described separately with reference to FIGS. 13–18.

In each of the FIGS. 5–12, the registers are merely a plurality of flip flops, one for each bit required which are enabled by the leading edge of the input signal and change at the trailing edge thereof. This keeps the boundary definitions from overwriting each other unintentionally. Each register has an associated flag identified by FL– and a number. These flags are merely flip flops which indicate that the registers are full by a "one" output and that the register is either empty or may be overwritten by a new boundary definition by a "zero" output.

INTERFACE AND INPUT BUFFER

Referring to FIG. 5, one example of the interconnection of the interface 40 and the details of the input buffer 42 will now be described. The interface 40 is connected through a plurality of AND gates 76 to an input buffer memory 78. The AND gates 76 are shown individually with one AND gate being connected to each bit of the interface 40. Hereinafter, such AND gates will be represented as a single AND gate block with a plurality of parallel lines identified by a slash mark across the circuit connection. The AND gates 76 are enabled by a signal SB to transfer the boundary definition word to the input buffer memory 78. The input buffer memory 78 is a first in—first out memory which may be made up of a plurality of integrated circuit memory cells connected together to the appropriate size. One commercially available integrated memory cell which may be used is a Fairchild NUL 9655 bit read/write memory cell. As mentioned previously, the input buffer memory must retain the boundary definitions in the order received and in order to do this the input buffer memory 78 has write and read address pointers 82 and 84 associated therewith. The write pointer 82 is counted upward every time a new word is stored in the input buffer memory 78 by a signal SBD. Essentially, the pointers 82 and 84 may be ring counters so that the words are continually placed in order in the input buffer memory 78. The write pointer supplies address information through a set of AND gates 80 which are also enabled by a signal SB. The read pointer 84 supplies address information through a set of AND gates 86 which are enabled by a signal SA and is counted up by a signal $SAD_2$. The boundary words are fed out from the input buffer memory 78 in the order received as appropriate by enabling a set of AND gates 88 which connect the input buffer memory 78 to a buffer register 90. The AND gates 88 are enabled by a signal $SAD_1$. Each register has a flag associated therewith to indicate whether the register has information therein or not. These flags are essentially flip flops which provide a "one" output when the register is full and "zero" when the register is empty. Associated with the interface is a flag FL–1 which is set by a signal from the input system indicating that a boundary word has been supplied to the interface 40. The flag FL–1 is reset by the signal SB which transfers that boundary word to the input buffer memory 78. Associated with the buffer register 90 is flag FL–2. Flag FL–2 is set by the signal $SAD_1$ which transfers a boundary word to the buffer register 90, and is cleared by a signal SFL–2C. In order to keep track of the number of words stored in the input buffer memory 78, a number stored counter 92 is provided which is counted up by the signal SB and is counted down by the signal SA. The particular number stored in the number stored counter 92 is connected to clock and logic circuitry 100. The condition of flag FL–1 and flag FL–2 are also connected to the clock and logic circuitry 100. The clock and logic circuitry 100 contains the clock signals and logic circuitry necessary to generate the control signals as set forth by the logic equations in Table 5. The precise circuitry needed for this will be described in detail hereinafter.

Operatively, the portion of the system shown in FIG. 5 is designed to receive boundary definitions from the input system, store them in order in the input buffer memory 78 and supply an individual boundary definition to the buffer register 90 as they are needed for selection by the merge 46 (FIG. 3B). Since the output is preferably to be displayed on a television set in which each scan line must be produced in 5.3 microseconds or a new intensity value needs to be produced every 104 nanoseconds, the cycle of the present invention is set at 100 nanoseconds. Thus, the clock signals cycle A and B as used in the logic equations of Table 5 occur every 100 nanoseconds with cycle A being produced in the first 25 nanoseconds and cycle B being delayed 25 nanoseconds after the trailing edge of cycle A as shown in FIG. 17.

The signals set forth in Table 5 are designed to maintain this operation in their required time period. More specifically, the signals SA and SB which read out a word and write in a word respectively are conditioned to occur each cycle and are dependent on the condition of the input buffer memory 78 and whether or not the buffer register 90 presently holds a boundary definition. The signal SA controls the transfer of newly received boundary definitions through the AND gates 76 into the input buffer memory 78 dependent on the occurrence of the cycle A signal, that the input buffer memory 78 is not already full and that a word is not being read at the same time as would be evidenced by flag FL–2·$\overline{SK}$. The signal SB is also delayed to produce the signal SBD which is used to count up the write pointer 82 so that the next boundary definition will be placed in order. The signal SA which controls the read address transfer and which is delayed to produce the signal $SAD_1$ which controls the reading out of the boundary definition is dependent on the input buffer memory 78 not being empty and on the fact the buffer register is either not full or the information therein is being read out as would be indicated by the signal SK which will be explained hereinafter. The signal $SAD_1$ is further delayed to produce the signal $SAD_2$ which counts up the read pointer 84 to be ready for the next boundary definition in order.

The remaining signals defined in Table 5 are essentially self-explanatory. The signals Empty and Full are dependent on the number stored in the number stored counter 96. The signal SCL1 is an overall system clear signal which may be initiated by a manual pushbutton for clearing all the registers of the system. The clear signal for the flag FL–2 is defined as SFL–2C which format will be used hereinafter for all flag clear signals. It depends on either the overall system clear SCL–1 or the condition that no word is being transferred to the buffer register as indicated by $SAD_1$ and that the present word in the buffer register 90 is being read out as would be indicated by either SC, SD, SP or SR which will be explained hereinafter.

These signals as well as the remaining signals defined in Tables 6–12 are used to control the system and transfer the boundary definitions in an orderly fashion to the appropriate register. They are timed as appropriate to maintain the necessary flow of information to generate the point intensity control signals at a rate sufficient to provide images in real time.

PRE-ADD & REGISTER B

The interconnection of the input buffer 42 with the pre-add & register B 44 is shown in greater detail in FIG. 6 with the signals for controlling this transfer being set forth by the logic equations in Table 6. Referring to FIG. 6, the portions in which the various values of the boundary definitions which are stored in the buffer register 90 are transferred to similar portions of a register B 102. The portions of the buffer register 90 in which the instructions and Y*o* value of the boundary definitions are stored are fed through a set of AND gates 104 to similar portions of the register B 102. The portions of the buffer register 90 in which the values I*o*, Y*c*, $\Delta X/\Delta Y$, $dI/dY$ and $dI/dX$ are stored are fed through a set of AND gates 106 to similar portions of the register B 102. Both of the sets of AND gates 104 and 106 are enabled by a signal from an OR gate 108 which has as one input a signal SC and as a second input a signal SD. The output of the OR gate 108 also sets the flag FL–3 associated with the register B 102. The portion of the buffer register 90 in which the value X*o* is stored is connected through a set of AND gates 110 which is connected to an OR gate 112 the output of which is connected to the portion of the register B 102 in which X*o* is stored. The X*o* portion of the buffer register 90 is also connected to an 18 bit adder 114 which supplies a signal through a set of AND gates 116 to a second input of the OR gate 112. The portion of the buffer register 90 storing $\Delta X/\Delta Y$ is also connected to the 18 bit adder 114. The AND gates 110 are enabled by the signal SC while the AND gates 116 are enabled by the signal SD. In addition, bit 0, bit 5 and bit 54 of the buffer register 90 as well as the flags FL–2 and FL–3 are connected to the clock and logic circuitry 100.

Operatively, the circuit shown in FIG. 6 functions to transfer boundary definitions from the buffer register 90 to the register B 102 as they are needed for selection by the merge 46 (FIG. 3*b*). The presence of the signal at bit 0 which is part of the instructions indicates that this is a boundary definition and not a data word as described previously. The data words are transferred to the registers D1, D2 62 (FIG. 3*b*) while the boundary definitions are fed to the register B 102. As can be seen from the equations and the circuitry, once it is determined that a boundary definition is in the buffer register 90 as indicated by the flag FL–2, the entire word is transferred to the register B 102 with the only variance being whether the pre-add operation is to be effected. That is, if no pre-add is to take place then the signal SC is generated. The signal SC is dependent on the clock signal A; that the buffer register is full; that either nothing is in the register B as indicated by a $\overline{FL-3}$ or that it is being transferred therefrom which is indicated by the signal SK; that a boundary definition exists; and that this is not a negatively sloped boundary edge as indicated by $\overline{Bit-54}$ or that the pre-add is to be disabled as indicated by the disable pre-add Bit-5. As discussed previously, if the slope is negative, then it must be updated where a line is desired to be displayed, since the procedure for displaying lines requires that all points through which the line passes are to be intensified. The disable pre-add bit provides flexibility for skipping this pre-add when the calculations have been done previously or when the generation of a line is not desired. The signal SD is the same as signal SC except for the fact that it exists where there is no disable pre-add as indicated by $\overline{Bit-5}$ and where Bit–54 has a one output indicating a negative slope. Thus, depending on which one exists, the value for X*o* will either be stored directly through the AND gate 110 and OR gate 112 to the X*o* portion of the register B 102 or it will be pre-added by the addition of $\Delta X/\Delta Y$ in the 18 bit adder 114 and fed through the AND gate 116 and then through the OR gate 112 to the X*o* portion of the register B 102.

REGISTERS D1, D2

The interconnection of the buffer register 90 with the registers D1, D2 62 will now be described with reference to FIG. 7 and the associated Table 7. All of the bits of the buffer register 90 are connected through a set of AND gates 120 to the register D1 122 and through a set of AND gates 124 and one input of a set of OR gates 126 to the register D2 128. Also connected through the OR gate 126 to the register D2 128 is the contents of register D1 122 which is connected through a set of AND gates 130 thereto.

The AND gates 120 are enabled by the signal SP which is dependent on the clock signal cycle A, the buffer register being full as indicated by flag FL–2, that bit 0 of the buffer register 90 is zero indicating that the contents is a data word and that the register D2 128 is already full as indicated by a flag FL–5 and a $\overline{\text{LXT}}$ signal or that another word is already stored in register D1 122 and is to be supplied to register D2 presently as indicated by flag FL–4·LXT. The signal SP also sets the flag FL–4 which is associated with register D1 122. The flag FL–4 is reset by the signal SFL–4C, which is dependent on either the system clear signal $SCL_1$or the reading out of the data word without replacement by a new data word.

The AND gates 124 are enabled by the signal SR which indicates that the register D2 128 is available for receiving the data word directly rather than storing it temporarily in register D1 122. The AND gates 130 are enabled by a signal SQ which is dependent on the fact that a word is being held in the register D1 for transfer to register D2 when it becomes empty. Since both the signals SR and SQ transfer signals to the register D2, they are fed through an OR gate 132 to set a flag FL–5 associated with the register D2 and also are connected to reset a 0 to 10 counter 134 which keeps track of the number of intensity values being transferred out of the register D2 128. The flag FL–5 is reset by a signal SFL–5C. The data word is shifted nine bits to the left in register D2 128 by a signal SS which also causes the 0 to 10 counter 136 to count up. Bit–0 of the buffer register 90, the number stored in the 0 to 10 counter 134 and the flags FL–4 and FL–5 are connected to the clock and logic circuitry 100.

Operatively, the circuitry of FIG. 7 responds to Bit–0 of the instruction portion of the information stored in the buffer register 90 which when zero indicates that a data word is contained therein and that it should be transferred to the registers D1, D2 62 (FIG. 3*b*). The data word in the buffer register 90 is transferred directly to register D2 128 through the AND gates 134 and the OR gate 126 when the AND gates 134 are enabled by the signal SR. If the register D2 is already full as would be indicated by the fact that there is flag FL–5 or that another data word in the register D1 122 is to be transferred thereto next, then the data word in buffer register 90 is transferred to the register D1 through the AND gate 120 by the enabling signal SP. Any word previously stored in the register D1 122 is transferred to the register D2 128 when that register becomes empty by the signal SQ, which enables the AND gates 130 to transfer the word from the register D1 through the OR gate 126 to the register D2 128.

Once in the register D2 the individual point intensity values are then read out sequentially by shifting the information in the register D2 128 to the left nine bits at a time by the signal SS. The number of shifts are kept track of by the 0 to 10 counter 134 which is reset when the register D2 is empty.

The logic equations for generating the signals as set forth in Table 7 are essentially self-explanatory. The signals SP, SR and SQ merely function to place the data words in order in the register D2 128 as it becomes available. The signal SS depends on the clock signal A, the existence of information in the register D2 128 and the request for intensity value when appropriate as indicated by the signal RIP. This request for intensity signal is dependent on the intensity instructions of the boundary definition associated with the data word and will be explained in further detail hereinafter. The flag FL–5 which indicates the presence of information in the register D2 128 is reset by the signal SFL–5C which depends on the signal RST or the fact that all the information in register D2 128 has been read out and no further information is being transferred thereto. The signal RST takes care of the situation where data words contain less than 11 point intensity values by occurring in response to either the overall system clear signal $SCL_1$ or the transfer of a new boundary definition to the instruction register 52 as indicated by the signal SJ as will be explained in detail hereinafter. If a request for intensity signal occurs with no information in the register D2 128 then a signal error 1 occurs which will be discussed infra.

MERGE REGISTER C AND INSTRUCTION REGISTER

The interconnection of the merge 46, the register C 48 and the instruction register 52 is shown in detail in FIG. 8 with associated Table 8 setting forth the logic equations producing the transfer and control signals used in this portion of the system. Merge 46 includes the decision blocks 140, 142 and 144 which compare the next occurring boundary definition previously utilized and the next newly received boundary definition which are stored in the register A 74 and the register B 102 respectively. The merge 46 also includes a decision block 146 which controls the transfer of the selected boundary definition to the register C 48. The decision block 140 compares the Bit–0 of the boundary definition which once operated upon indicates the least significant bit of the scan line in which it previously appeared with the least significant bit of the present scan line being generated. If they are not equal, then the next previously used boundary definition is to appear at some point in the present scan line. If not, then it is known that the newly received boundary definition must be the next to appear. The output signal of the decision block 140 is a signal AC which is "one" when Bit–0 does not equal the least significant bit of the *Y* count. The signal AC is connected to the clock and logic circuitry 100. The decision block 142 compares the value X*i* from the previously used boundary definition in the Register A 74 with X*o* of the newly received boundary definition in the register B 102 to produce an output signal AB which is "one" when X*i* is greater than X*o*. If the previously used boundary definition is to appear at some point in the scan line presently being generated then the boundary definition with the smaller *X* value appears first. The decision block 144 is connected to receive the signal $Y_{CNT}$ from the clock and logic circuitry 100 and the value Y*o* from the boundary definition stored in the register B 102 to provide an output signal BC which is "one" if Y*o* is less than or equal to $Y_{CNT}$. The signal BC is supplied to the clock and logic circuitry 100. If Y*o* is less than or equal to the *Y* count then the newly received boundary definition in the register B 102 is to appear in the present scan line.

The register A has a flag FL–10 associated therewith to indicate that it is occupied by a boundary definition. The flag FL–10 is reset by a signal SFL–10C which occurs if an overall system clear signal SCL1 is generated or if the boundary definition therein is transferred from the register A 74 as indicated by the signal SC and no other stored words are supplied thereto as would occur if the memory A were empty. The register A 74 is connected to one input of a set of AND gates 148 the output of which is connected to a set of OR gates 150. The output of the OR gate 150 is connected to the register C 48. The register B 102 is connected to one input of a set of AND gates 152 the output of which is connected to a second input of the OR gate 150.

The value X*i* stored in the register C is connected to the decision block 146 the output of which is a signal XIC which is connected back to the clock and logic circuitry 100. The register C is connected to one input of a set of AND gates 154 the output of which is connected to the instruction register 52. The AND gates 148 are enabled by a signal SE which as set forth in Table 8 is dependent on the clock signal A; that the register A 74 is full as indicated by FL–10; that the boundary definition in the register A is appropriate to the present scan line as indicated by the signal AC; and that either the boundary definition in register B is not appropriate as indicated by the signal $\overline{BC}$ or the boundary definition in register A occurs first in the scan line as indicated by the signal $\overline{AB}$. The signal SE is also dependent on the fact that either the boundary definition previously stored in the register C 48 is being transferred out as indicated by the signal XIC or that the register C 48 is empty as indicated by the signal $\overline{FL\text{–}6}$. The AND gates 152 are enabled by a signal SF which responds to the same conditions as the signal SE except that the boundary definition in register B 102 has been determined to appear first. This is indicated by the fact that the boundary definition in register B 102 is to appear in the present scan line by the signal BC and that either the boundary definition in the register A 74 is not to appear in the present scan line as indicated by the signal $\overline{AC}$ or that the boundary definition in register B is to appear first, as indicated by the signal AB. Although not shown in FIG. 8 for clarity, both the AND gates 148 and 152 do not transfer the information from Bit–0 of either the Register A 74 or the Register B 102. Instead, the least significant bit of the Y count, LSB $Y_{CNT}$, is connected to Bit–0 of the Register C 48. This connection may be made through an AND gate enabled by either the signals SE or SF. Furthermore, the individual AND gates of the set of AND gates 152 are connected to the Register C 48 such that the data representing Y*o* is discarded while the remaining data is rearranged in accordance with the data format of FIG. 4*b*. The signal STPMRG is an error signal which stops the merge operation when the register B 102 is empty indicating that the input is not keeping up with the output, and a switch SW 5 (not shown) is closed. The switch SW 5 is a manual switch which may be opened if the STPMRG signal is not desired.

The AND gates 154 transferring the boundary definition in register C 48 to the instruction register 52 is dependent on the signal SJ which occurs when a boundary definition is contained in register C 48 as indicated by flag FL–6 and the occurrence of signal XIC indicates that the value of *X* for the boundary definition stored in the register C 48 is less than or equal to the *X* count. Less than or equal is used to avoid emphasizing any errors which occur by the boundary definition being transferred after point intensity control signals have begun to be generated for the portion of the display screen to which it pertains. Since the test is less than or equal the boundary definition will be transferred as soon as it should appropriately be transferred or anytime thereafter. The enabling signal SJ also sets the flag FL–7 which is associated with the instruction register 52. The flag FL–6 associated with the register C 48 is set by either of the signals SE or SF which transfer words thereto by connecting these signals through an OR gate 156 to the setting input of the flag FL–6. The outputs of all the flags are connected to the clock and logic circuitry 100.

In operation the appropriate boundary definition from either the next previously used boundary definitions as would be stored in the register A 74 and the next newly received boundary definition as would be stored in the register B 102 is selected as the next boundary definition to be utilized to control the display. In order to make this decision both boundary definitions are checked by the decision blocks 140 and 144 respectively to determine whether they appear in the scan line presently being generated. If either do not then it is clear that the other is to appear first and is therefor to be transferred to the register C 48 and then on to the instruction register 52. If both do appear, then the one appearing first is chosen by the decision block 142, the output signal AB of which controls whether the signal SE or SF is generated. These decision blocks provide output signals which together with the signals indicating that information is stored in the various registers or that the register is available for receiving new information control the and gates 148 and 152 selectively. The decision block 146 determines when the selected boundary definition which is stored in the register C 48 is to be transferred to the instruction register 52 for control of the generation of point intensity control signals. This transfer occurs when the *X* count which is representative of the position along any particular scan line is greater than or equal to the *X* value at which the selected boundary definition is to appear.

INSTRUCTION REGISTER, REJECT REGISTER, UPDATE PROCESSOR AND STORE REGISTER

Figure 9:
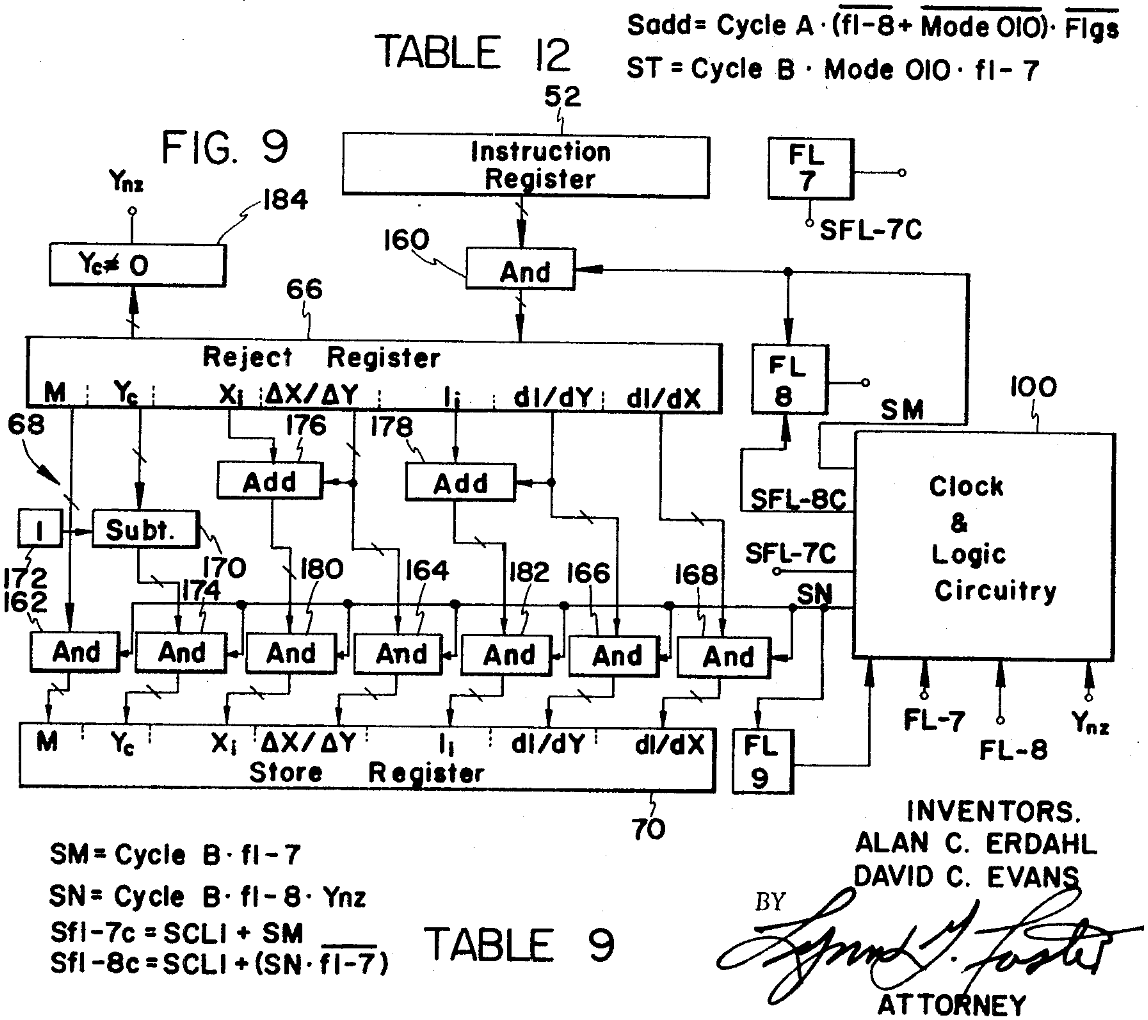
FIG. 9 is a schematic diagram of an embodiment of the instruction register, reject register, update processor and store register.

The detailed circuitry of the Instruction Register 52, the Reject Register 66, the Update Processor 68 and the Store Register 70 is shown in FIG. 9 with the logic equations for the transfer and control signals given in the Table 9 associated therewith.

Referring to FIG. 9, the Instruction Register 52 is connected to one input of a set of AND gates 160 the output of which is connected to the reject register 66. The AND gates 160 are enabled by a signal SM supplied from the clock and logic circuitry 100. The signal SM is also supplied to set a flag FL–8 associated with the reject register 66. The flag FL–8 is cleared by a signal SFL–8C also supplied from the clock and logic circuitry 100.

The bits of the reject register 66 are selectively connected through the update processor 68 to the store register 70. More specifically, the instructions M, $\Delta X/\Delta Y$, $dI/dY$ and $dI/dX$ are connected through sets of AND gates 162, 164, 166 and 168 respectively to the appropriate portions of the store register 70. Y*c*, X*i* and I*i* must be updated for the next scan line before being stored. The Y*c* portion of the reject register 66 is connected to a subtractor 170 which also is connected to a register 172 holding the value one (1). The output of the subtractor 170 is connected through a set of AND gates 174 to the Y*c* portion of the store register 70. The X*i* and I*i* portions of the reject register 66 are connected to adders 176 and 178 respectively which are also connected to the $\Delta X/\ \Delta Y$ and $dI/dY$ portions of the reject register 66 respectively. The outputs of the adders 176 and 178 are connected through sets of AND gates 180 and 182 respectively to the store register 70.

All of the sets of AND gates 162, 164, 166, 168, 174, 180 and 182 are enabled by a signal SN from the clock and logic circuitry 100. The signal SN also sets a flag FL–9 associated with the store register 70.

The Y*c* portion of the reject register is also connected to a decision block 184 in which the value of Y*c* is tested to determine if it is zero and if not provides an output signal YNZ which is supplied to the clock and logic circuitry 100. The condition of the flags FL–8 and FL–9 are also supplied to the clock and logic circuitry 100.

In operation, once a boundary definition is transferred to the instruction register 52, the intensity function specified is supplied to the intensity function control for generating intensity control signals. One half a cycle later it is transferred to the reject register 66 by enabling the AND gates 160 by the signal SM which as given in Table 9 responds to cycle B and the flag FL–7 which indicates that a boundary definition is held in the instruction register 52. By making the signal SM responsive to cycle B the boundary definition is transferred one half a cycle after that boundary definition was supplied to the instruction register 52.

The boundary definition now in the reject register 66 is tested to see if the bounded area to which it pertains has been completed by checking if Y*c* is equal to zero in the decision block 184. If it is zero then that boundary does not appear in any other scan lines and nothing further is done with that boundary definition which will be discarded when the next boundary definition supplies to the reject register 66 overwrites it. If Y*c* is not equal to zero then the decision block 184 has an output signal YNZ which indicates that the boundary definition should be updated and stored for future use. This is done by providing the signal SN which is dependent on the existence of the signal YNZ, the cycle B clock signal and the existence of a boundary definition in the reject register 66 as indicated by the flag FL–8 having an output signal. The signal SN enables the AND gates 162, 164, 166, 168, 174, 180 and 182 to pass the updated boundary definition to the store register 70 and set the flag FL–9 associated with the store register 70. In the update processor 68 the values of the instructions M, $\Delta X/ \Delta Y$, $dI/dY$ and $dI/dX$ do not change and are therefore passed directly through to the store register 70.

The values of $Yo$, $Xi$ and $Ii$ must be updated. $Yc$ is updated by subtracting the value one (1) stored in the register 172 from the present $Yc$ in the subtractor 170 and supplying the result to the store register 70. $Xi$ and $Ii$ are updated by adding the values of $\Delta X/\Delta Y$ and $dI/dY$ to them respectively in the adders 176 and 178 and supplying the results to the store register 70.

In addition, the flag FL–7 is cleared by either the overall system clear signal SCL1 or the signal SM which indicates that the information has been transferred to the reject register 66; and the flag FL–8 is cleared by the overall system clear signal SCL1 or the occurrence of the signal SN together with no output from the flag FL–7.

STORE REGISTER MEMORY A AND REGISTER A

The detailed circuitry for the interconnection of the store register 70, the memory A 72 and the register A 74 is shown in FIG. 10 with the logic equations of the transfer and control signals given in Table 10 associated therewith. The store register 70 is connected through a set of AND gates 190 which are enabled by a signal SH from the clock and logic circuitry 100. The output of the set of AND gates 190 is connected to the memory A 72. Memory A which is essentially the same as the input buffer memory 78 also includes write and read pointers 192 and 194 which are connected through sets of AND gates 196 and 198 to control the reading and writing of information into the memory A in the same manner as write and read pointers 82 and 84 of FIG. 5. The AND gates 196 are also enabled by the signal SH from the clock and logic circuitry 100.

The write pointer 192 is counted up by a signal SHD which is the signal SH delayed. Information is transferred from the memory A through a set of AND gates 200 to the register A 74. The AND gates 200 are enabled by a signal $SGD_1$ from the clock and logic circuitry 100. The signal $SGD_1$ is a signal SG delayed which enables the AND gate 198 to supply the read pointer to the memory A 72. The read pointer 194 is counted up by a signal SGD2 which is $SGD_1$ delayed. As similar to the signal SA and its delayed counterparts SAD1 and SAD2, the signals SG, SGD1 and SGD2 are used to provide the read pointer to the memory A, enable the boundary definition to be transferred and count up the read pointer 194 to be ready to read the next boundary definition is order. The signal SG is also connected to set the flag FL–10 associated with the register A 74 and count down a number stored counter 202 which keeps track of the number of boundary definitions stored in the memory A 74. The number stored counter 202 is counted up by the signal SH which transfers boundary definitions to the memory A 74. The output of the stored counter 202 is supplied to the clock and logic circuitry 100 as are the outputs from the flags associated with the store register 70 and register A 74 FL–9 and FL–10 respectively.

In operation boundary definitions once updated and stored in the store register 70 are transferred into the memory A 72 through the AND gates 190 which are enabled by the signal SH. This is done during the clock signal cycle B as long as the memory A is not full and there is a word in the store register to be stored in the memory A 72. The particular location in which that boundary definition is stored is controlled by the write pointer 192 which is connected to the memory A through the AND gates 196 which are also enabled by the signal SH. After storage the write pointer 192 is counted up to be ready for the next boundary definition to be stored by the signal SHD which is the signal SH delayed. The delayed signal is used to allow the first boundary definition to be stored in the proper location before counting up.

As boundary definitions are needed by the register A the next boundary definition in order is fed from the memory A 72 through the AND gates 200 to the register A 74. This read out operation is controlled by the signal SG and its delayed counterparts which are delayed appropriately so that the proper word can be read out. The signal SG occurs during the cycle A clock signal and is conditioned on the fact that the memory A 72 is not empty and that either there is nothing stored in the register A 74 which must be saved as indicated by the zero output from the flag FL–10 or the occurrence of the signal SE which indicates that the boundary definition in register A 74 has been selected by the merge operation and is being read out. The AND gates 200 are enabled by the signal SGD1 which is delayed from SG so that the appropriate boundary definition is pointed to by the read pointer 194 before the boundary definition is read out. The read pointer is then set for the next boundary definition by counting up the read pointer 194 by the signal $SGD_2$ which is the signal $SGD_1$ delayed. The number of boundary definitions stored in memory A are kept track of by the number stored counter 202 which is counted down every time a word is transferred from the memory A 72 as indicated by the signal SG and counted up every time a word is stored therein as indicated by the signal SH. The write and read pointers 192 and 194 may of course be cleared by the signal SCL1 and the flag FL–9 may be cleared by the signal SFL–9C which is either the all clear signal SCL1 or the occurrence of reading out the information from the store register which is indicated by the signal SH together with the fact that no further information is being stored therein which is indicated by the absence of the signal SN.

INTENSITY FUNCTION CONTROL

The details of the circuitry for the intensity function control are shown in FIG. 11 with the logic equations for the transfer and control signals given in Table 11 associated therewith. In order to generate the variety of intensity functions the present invention includes intensity mode instructions in the instruction portion of each boundary definition. These various modes are utilized to generate the particular transfer and control signals for supplying the appropriate information to either the constant intensity register 56, the shader 60 or to receive the individual intensity control values from the register D2 128. To accommodate these various intensity functions the various portions in which the particular values in the instruction register are connected to these function generators through AND gates which are enabled in response to particular mode instructions.

More specifically, the mode bits and the priority bit PR of the instruction register 52 are connected to the clock and logic circuitry 100. The portion of the instruction register 52 in which the value $I_i$ and $dI/dX$ are stored are connected to sets of AND gates 210 and 212, respectively, the outputs of which are connected to the shader 60 which will be described in detail hereinafter. The AND gates 210 and 212 are enabled by a signal ST from the clock and logic circuitry 100 which is controlled by a particular mode instruction which will be explained in detail hereinafter. The nine significant bits of the portion in which $I_i$ is stored in the instruction register 52 is also connected to a set of AND gates 214 to the constant intensity register 56. The AND gates 214 are enabled by a signal SU which stores this value in the constant intensity register automatically on the occurrence of the cycle B clock signal once the flag FL–7 is set as long as there is no priority signal $Pri$. The output from the shader which consists of digital point intensity control signals are fed through a set of AND gates 216 which are enabled by a signal SX through an OR gate 218 to the intensity buffer 64 from which they are supplied to either the data disk 20 or the D to A converter 14 (FIG. 1). The output from the constant intensity register 56 is fed through a set of AND gates 220 and then through the OR gate 218 to the intensity buffer 64. The AND gates 220 are enabled by a signal SY. If a nonlinear intensity function is specified by the mode instructions then the signal RIP is provided to the shift register D2 128 and a set of AND gates 222 are enabled by a signal SZ to supply these point intensity values through the OR gate 218 to the intensity buffer 64. A priority flag 224 which supplies the signal P*ri* to the clock and logic circuitry 100 is cleared by a signal PRC and set by a signal PRS supplied from the clock and logic circuitry 100.

In order to provide the ability to display lines the portion of the instruction register 52 where *dX/dY* is stored is connected through an absolute value converter 226 to an adder 228. Also connected to the adder 228 is the first nine bits of the portion in which the value Xi is stored in the instruction register 52. The output of the adder 228 is connected to a set of AND gates 230 which are enabled by a signal SV from the clock and logic circuitry 100. The output of the AND gates 230 are connected through an OR gate 232 to the count register 58 which provides an output signal CZ which is supplied to the clock and logic circuitry 100. In order to allow constant intensity signals to be provided for a count where a priority bit exists, the first nine bits of the portion of the instruction register 52 where *dI/d*X is stored is connected to one input of a set of AND gates 234 which are enabled by a signal SW. The output of the AND gates 234 is connected to a second input of the OR gates 232. The count register 58 is counted down by a signal SCX supplied from the clock and logic circuitry 100. The various modes which may be specified by the mode instruction bits of the boundary definition are set forth as follows:

Mode
000 — Turn beam off
001 — Line mode
010 — Linear shading (Initialize shader)
011 — Return to mode 010 (do not reinitialize shader)
100 — Constant Intensity mode
101 — Constant Intensity for Count (then return to mode 010)
110 — O-D mode (display point information)
111 — End of frame synchronization Dependent on which of these mode instructions are specified, various ones of the transfer and control signals given in Table 11 will be generated from the clock and logic circuitry 100 to selectively enable the appropriate AND gates. For example, if the linear shading mode 010 is specified then the signal ST will occur on the occurrence of the cycle B clock signal and on the condition that a boundary definition instruction is contained in the instruction register 52 as indicated by the flag FL–7. The signal ST will enable the AND gates 210 and 212 to supply the values I*i* and *dI/d*X to the shader 60. Furthermore, with a mode 010 and no priority signal or the existence of a constant intensity for count which has been completed, then signal SX will be generated by the clock and logic circuitry 100 to enable the AND gates 216 to pass digital point intensity control signals from the shader 60 through the OR gate 218 to the intensity buffer 64 from which they are supplied to the display device. If a constant intensity signal is desired either for a particular count or for the generation of a line then the value I*i* which is stored by the signal SU through the AND gates 214 to the constant intensity register 56. The AND gates 220 will then be enabled by the signal SY to pass the constant intensity value each cycle through the OR gate 218 to the intensity buffer 64. If a nonlinear intensity function is specified by the mode 110 then the block and logic circuitry 100 will generate the RIP signal to shift the information out of the register D2 128 and enable the AND gates 222 to pass that information on through the OR gate 218.

If the constant intensity signal is to be due to the line mode 001 then the AND gates 230 are enabled by the signal SV to pass the addition of the fractional portion of X*i* and the absolute value of $\Delta X/\Delta Y$ through the adder and on to the count register 58. This is done in accordance with equation (1) given previously. The value one in equation (1) is added in automatically since any boundary definition must control for at least one point. The absolute block merely passes a positive $\Delta X/\Delta Y$ to the adder since negative $\Delta X/\Delta Y$'s are stored as complement functions. The result of this addition is stored in the count register 58 which removes the signal CZ until the count register is counted down to zero by the signal SCX. If a constant intensity for count is desired by mode 101 then the AND gates 234 are enabled by the signal SW which is responsive thereto to pass the first nine bits of *dI/d*X which will be representative of the count desired through the OR gate 232 to the count register 58.

The priority bit is applicable to either the line mode 001 or the constant intensity for count mode 101. It permits an overwrite function regardless of how many further boundary definitions are passed by preventing any new constant intensity values from being passed to the constant intensity register 56 by disabling the signal SU when the priority bit exists.

From this explanation and consideration of the logic equations, the detailed operation of this portion of the system will be clearly understood by those skilled in the art. In addition, the signal FLGS is an error signal included to stop the generation of point intensity control signals if an error exists. Therefore, the signals SX, SY and SZ which supply the point intensity control signals are dependent on the non-existence of the signal FLGS.

THE SHADER

Figure 12:
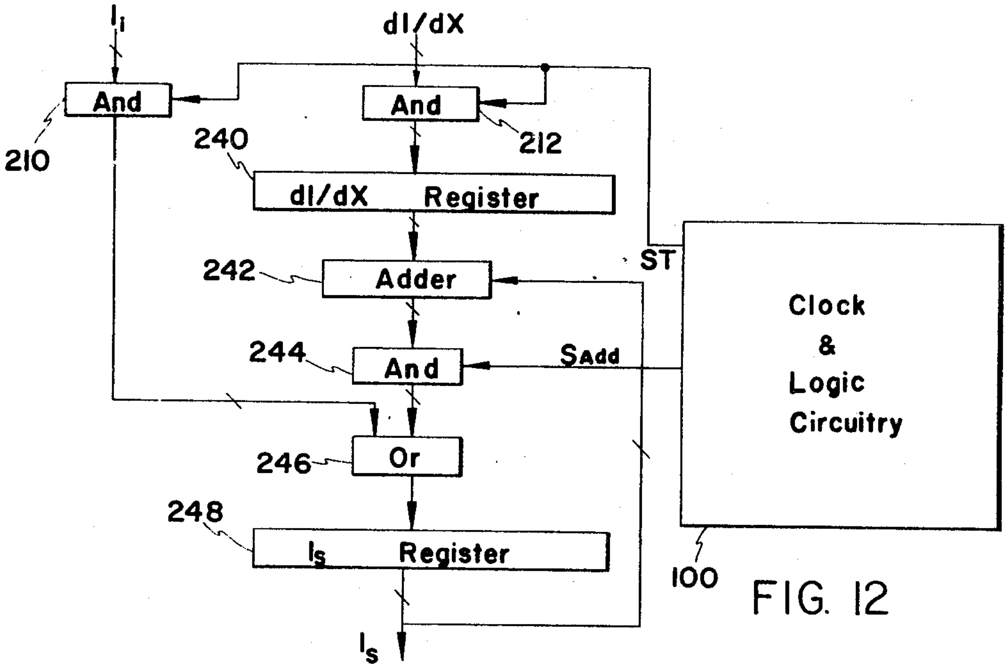
FIG. 12 is a schematic diagram of an embodiment of the shader.

The shader 60 is shown in detail in FIG. 12 with the logic equations of the transfer and control signals being given in Table 12 associated therewith. The shader includes a *dI/d*X register connected to the output of the AND gates 212 to receive the value *dI/d*X from the instruction register 52. The value in the *dI/d*X register is supplied to an adder 242, the output of which is connected to a set of AND gates 244 which are enabled by a signal $S_{add}$ from the clock and logic circuitry 100. The output of the AND gates 244 are connected through a set of OR gates 246 to an IS register 248. The output of the IS register is connected to the AND gates 216 of FIG. 11 and also to a second input of the adder 242. The value $I_i$ are supplied from the instruction register 52 through the AND gates 210 the output of which is connected to a second input of the OR gates 246.

In operation upon the occurrence of the signal ST supplied from the clock and logic circuitry 100 the value $I_i$ is fed through the AND gates 210 and through the OR gate 246 to the IS register 248. The value *dI/d*X is supplied through the AND gates 212 to *dI/d*X register 240. Since the signal $S_{add}$ is dependent on the output of flag FL–8 being low or no new mode 010 which initializes the shader, the addition of *dI/d*X to the present $I_i$ value in the adder 242 is prevented from being fed to the IS register. This is for one cycle to allow the value $I_i$ to be used directly for the first point. Since the word is passed from the instruction register 52 to the reject register 66 during cycle B and will be up for one cycle thereafter. After the first point intensity control signal is supplied then the signal $S_{add}$ will enable the AND gates 244 to add the value *dI/d*X to the value presently stored in the IS register 248 each cycle, thereby linearly increasing the intensity control signal for each successive point.

CLOCK AND LOGIC CIRCUITRY

The clock and logic circuitry 100 generates the transfer and control signals according to the logic equations given in Tables 5–12. The logic circuitry required is conventional and various circuits for generating these signals will be readily apparent to those skilled in the art.

For example, the logic circuitry may take the form illustrated in FIGS. 13–16.

Referring to FIGS. 13-16, the logic circuitry illustrated includes AND gates, OR gates, inverters and delays appropriately arranged to generate the various transfer and control signals in accordance with the logic equations given in Tables 5–12.

Figure 13:
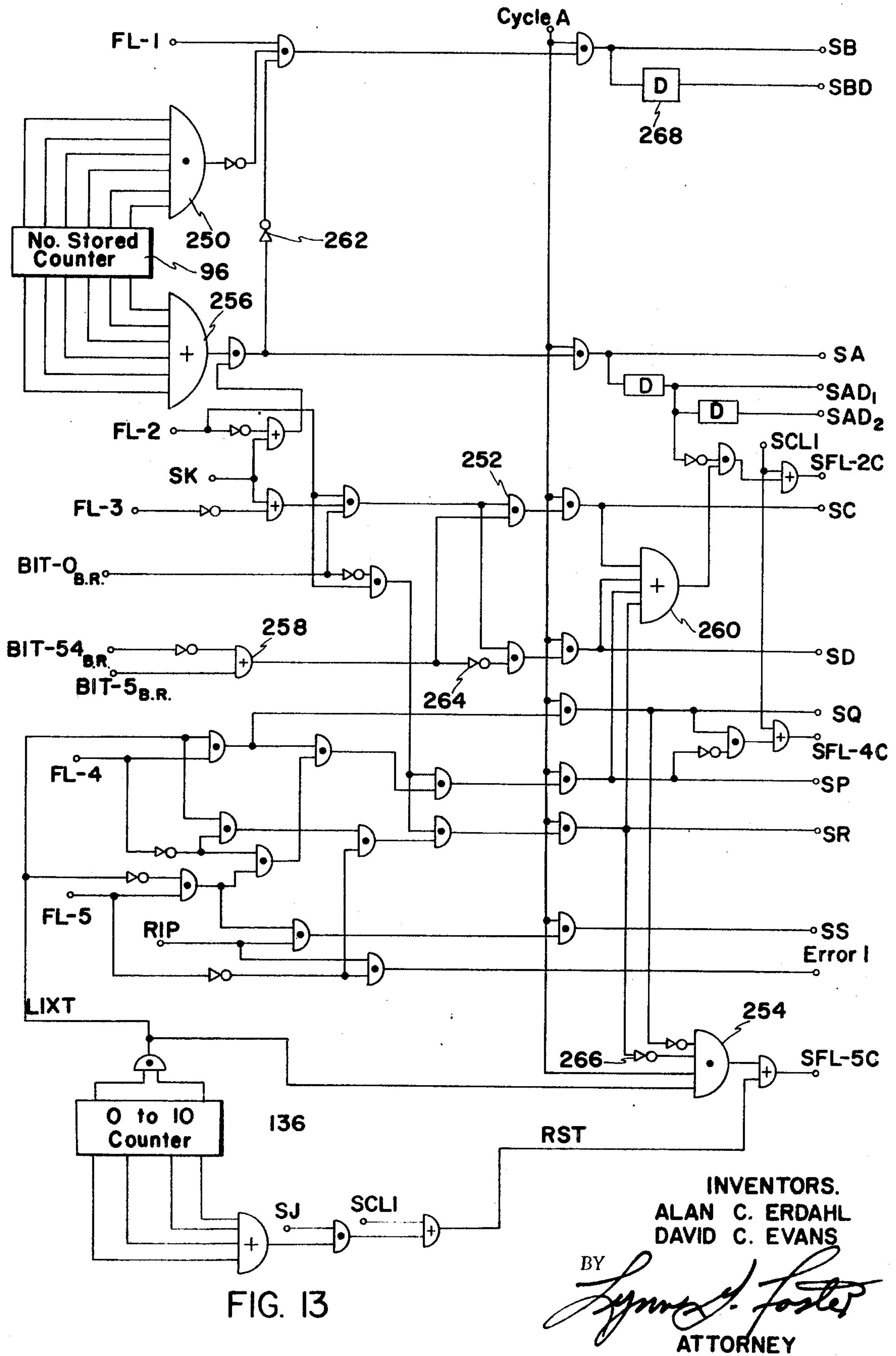
Figure 14:
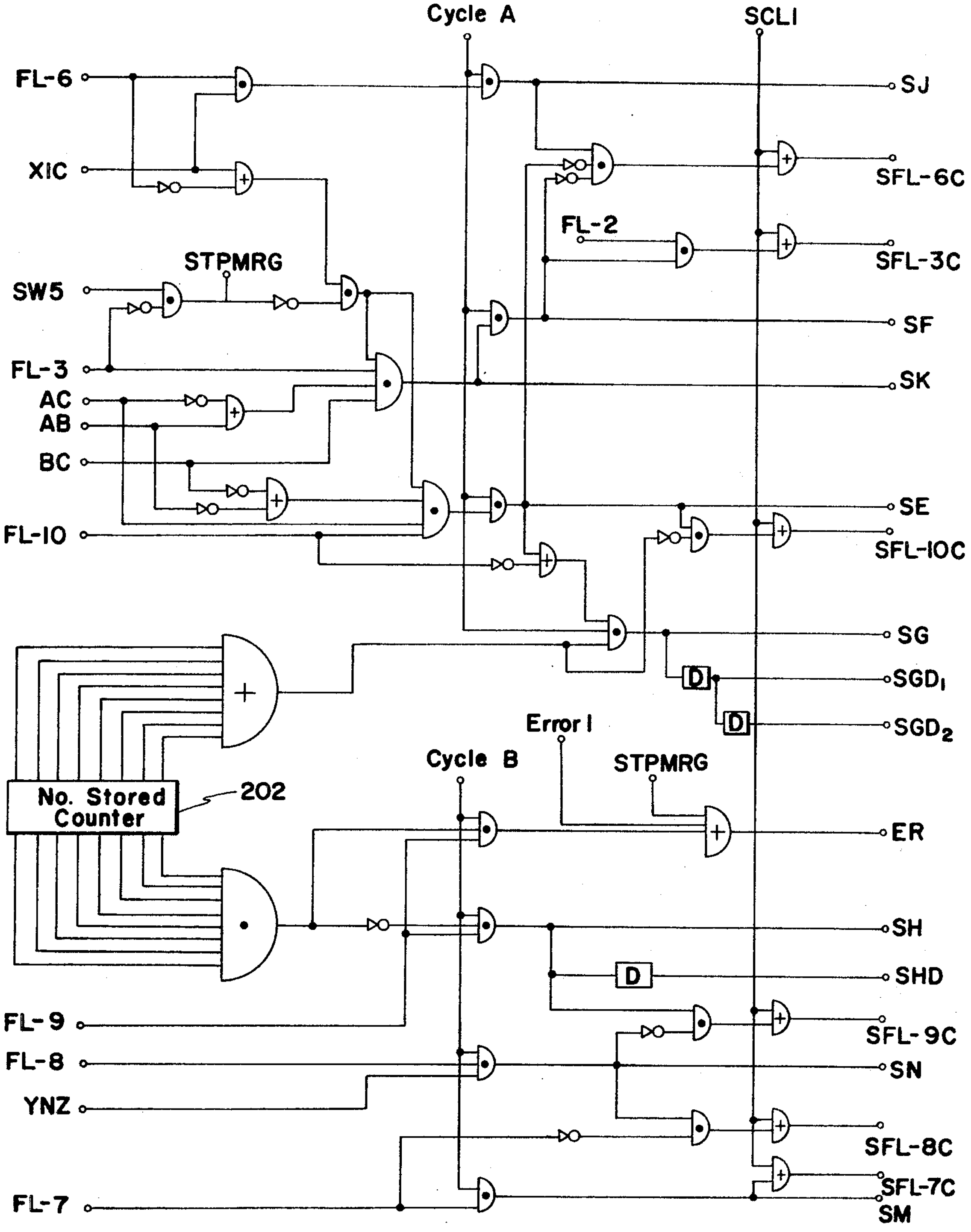
Figure 15:
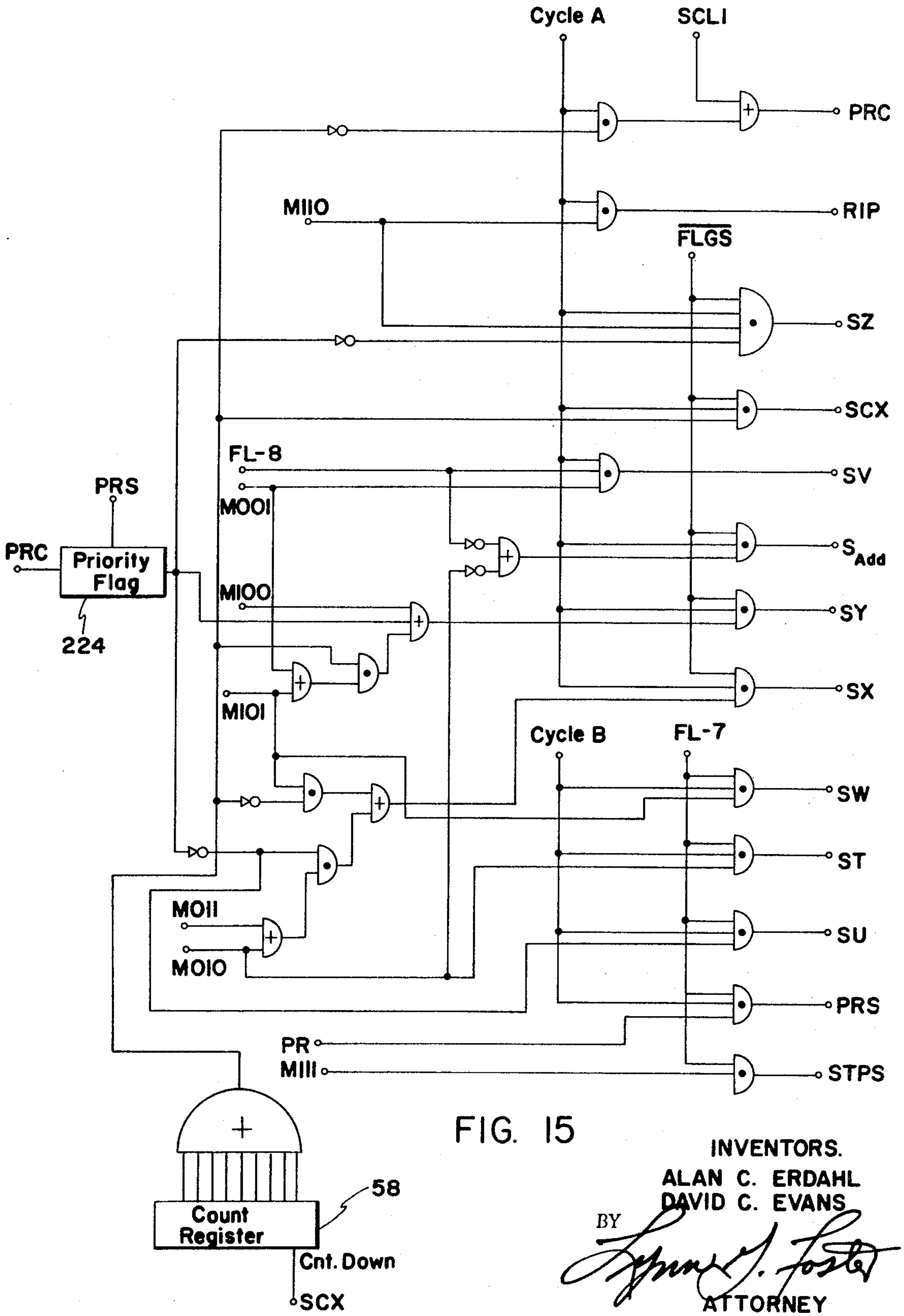

For example, the elements designated 250, 252 and 254 in FIG. 13, as well as all similarly illustrated elements in FIGS. 13–16, are AND gates which have a high output signal only when all the input signals thereto are high. The elements designated 256, 258 and 260 in FIG. 13 as well as all similarly illustrated elements in FIGS. 13–16 are OR gates which have a high output signal if any one of the input signals thereto is high. The elements designated 262, 264 and 266 in FIG. 13 as well as all similarly illustrated elements in FIGS. 13–16 are inverters which provide an output signal opposite in sense to the input signal. Finally, the element designated 268 in FIG. 13 as well as all similarly illustrated elements in FIGS. 13–16 is a conventional delay which may be a conventional one shot multivibrator.

The *X* and *Y* count and control circuit 50 which is a part of the logic circuitry 100 is illustrated in FIG. 18. This portion of the logic circuitry is responsible for generating the *X* and *Y* count signals $X_{CNT}$ and $Y_{CNT}$, the synchronization signals Xsync and Ysync, and the error signals for controlling the generation of the image. Referring to FIG. 18, the count and control circuit 50 includes a plurality of flip-flops 270, 272, 274 and 276 which are labeled STP, Xsync, Y sync and Error, respectively. All of these flip-flops are conventional flip-flops having set and clear inputs indicated as S and C in FIG. 18. Each of the flip-flops is triggered by the clock signal cycle A. The signals STPS, *X* overflow, *Y* overflow and ER are connected to the set inputs of the flip-flops 270-276, respectively. Manual switches SW1–4 are included in the set input lines of the flip-flops 270–276, respectively. Connected to the clear inputs of each of these flip-flops is the output of OR gates 278, 280, 282 and 284, respectively. Each of these OR gates includes two inputs, one of which is connected to receive the signal SCL1 and the other connected to external signals, EXT1, 2, 3 and 4, respectively.

The outputs of the flip-flops 270–276 are each connected to an input of an OR gate 286. The output of the OR gate 286 represents the signal FLGS which is connected to other circuitry in the logic circuitry 100. The output is also connected through an inverter 288 to one input of an AND gate 290. Connected to a second input of the AND gate 290 is the clock signal cycle A. The output of the AND gate 290 is connected to count up an *X* counter 292, the output of which is the signal $X_{CNT}$. An *X* overflow signal which indicates the *X* counter has reached its limit, is taken from the *X* counter 292 and supplied back to switch SW2 and also to one input of an AND gate 294. Connected to a second input of the AND gate 194 is the clock signal cycle A. The output of the AND gate 294 is connected to count up a *Y* counter 296, the output of which is the signal $Y_{CNT}$. Also supplied from the *Y* counter is the least significant bit of the $Y_{CNT}$ signal, LSB $Y_{CNT}$. A *Y* overflow signal from the *Y* counter 296 is connected to the switch SW3.

In operation the *X* and *Y* count and control circuit 50 of FIG. 18 functions to provide continuous *X* and *Y* position information to the various portions of the display generator system to maintain the orderly generation of the image. The various flip-flops 270, 272, 274 and 276 are utilized to provide control for stopping the count when the image is completed as indicated by the signal STPS; when synchronization is required at the end of each scan line and at the ER of the frame as indicated by the signals Xsync and Ysync, respectively, and when an error occurs as indicated by the signal ER. The switches SW1–4 are manual switches which allow any of these functions to be removed which will allow the continued generation of the image despite some error or asynchronous occurrence. The external signals 1–4 may be provided by a storage or display device to maintain the generation of the image in synchronization with such display or storage. If any of the count stopping signals STPS, *X* overflow, *Y* overflow or ER occur and the switches are activated, the external signals 1–4 act to clear the flip-flops so as to permit resumption of the generation of the image in accordance with the demands and requirements of such a display or storage device.

The various decision blocks such as the decision blocks 142, 144 and 146 of FIG. 8, are conventionally available comparators. For example, these decision blocks may be of the type illustrated in FIG. 19.

Referring to FIG. 19, a nine-bit comparator for providing a high output signal when A ≥ B is shown, where A and B each represent nine-bit digital signals. The logic circuitry is made up of conventional logic elements. For example, the element designated 298, as well as all similarly illustrated elements in FIG. 19, is a positive NAND gate; the element designated 300, as well as all similarly illustrated elements, is a negative NOR gate; and, the element designated 302, as well as all similarly designated elements, is an AND gate. Both the positive NAND and negative NOR gates provide a high output signal unless both of the inputs are high.

Thus, a preferred embodiment for carrying out the novel method and system of the present invention has been disclosed. In addition, detailed circuits together with the necessary transfer and control signals have been disclosed for this embodiment. Other circuits may be used as well and such circuits will be readily apparent to those skilled in the art.

The invention may be embodied in other specified forms without departing from the spirit or essential characteristics thereof. The present embodiment is, therefore, to be considered in all respects as illustrative and not restricitve, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A system for generating a pictorial image of an object on a display device from information about the surfaces of the object to be displayed, comprising:

input means for receiving data representative of surfaces of said object to be displayed;

display control means for generating intensity control signals responsive to the data transferred thereto;

a display device connected to said display control means to receive said intensity control signals;

storage means connected to said display control means for storing the data transferred to said display control means;

merge means connected to said input means and said storage means for selecting the data representative of the surface next to be displayed from either newly received data in said input means or previously received data in said storage means; and circuit means connected between said merge means and said display control means for supplying the data selected by said merge means to said display control means.

2. The system of claim 1 wherein said data representative of surfaces comprises a plurality of boundary words with each of said boundary words defining both a boundary edge and an intensity function of the surface represented and wherein said input means includes buffer means for holding said boundary words and read-out means for supplying said boundary words to said merge means in the order received.

3. The system of claim 1 wherein said data defines the surfaces relative to the scanning pattern of said display device, and wherein said data is selected from either said input means or said storage means by said merge means in accordance with signals derived from said display control means and supplied to said merge means which represent the position of said scanning pattern for which intensity control signals are presently being generated.

4. The system of claim 3 wherein said merge means includes comparing means for comparing the data in said storage means with the data in said input means to determine the data next to be displayed on said display device according to the scanning pattern of the display device.

5. The system of claim 1 wherein said data is representative of the visible surfaces of the object to be displayed and wherein said data comprises a plurality of boundary words with each of said boundary words defining a single visible surface through specification of both a boundary edge and an intensity function of said surface in terms of the scanning pattern of the display device.

6. The system of claim 5 further having means responsive to each of said boundary words for controlling selected segments of said scanning pattern of the display device, and update processing means connected between said display control means and said storage means for updating each boundary word to be stored in said storage means for the next selected segment of said scanning pattern which said boundary word controls.

7. The system of claim 6 wherein said boundary words are stored in said storage means in the order in which said next selected segments appear in said scanning pattern of the display device.

8. The system of claim 6 wherein said update processing means includes test means for determining whether further selected segments of said scanning pattern are to be controlled by the boundary word being tested, said test means including means for storing said boundary word in said storage means only when further selected segments are to be controlled by that boundary word.

9. The system of claim 5 wherein said display control means comprises:

a register means connected to said circuit means for receiving the boundary words selected by said merge means, a plurality of intensity function control means for generating said intensity control signals responsive to the intensity function specified by the boundary word received by said register means, and gate means connected between said register means and said plurality of intensity control means for selectively controlling the transfer of the intensity function of the boundary word in said register means to one or more of said plurality of intensity control means, said gate means being selectively controlled by signals generated in response to intensity instructions specified by the intensity function of the boundary word in said register means.

10. The system of claim 9 wherein said plurality of intensity function control means includes both a linear intensity means for generating an intensity control signal which varies linearly with respect to said scanning pattern and a constant intensity control means for generating an intensity control signal which is constant.

11. The system of claim 9 wherein said plurality of intensity control means includes overwrite means for generating intensity control signals which produce a constant intensity control signal for a predetermined portion of said scanning pattern of said display device regardless of newly received boundary words in said register means.

12. The system of claim 9 wherein said plurality of intensity control means includes non-linear intensity means for generating intensity control signals which vary non-linearly with respect to said scanning pattern.

13. The system of claim 12 wherein said non-linear intensity means comprises:

shift register means connected to said input means for receiving boundary words specifying a plurality of non-linear intensity values, and gate means connected between said shift register means and said display device for selectively supplying said non-linear intensity values to said display device in response to the intensity instructions of the boundary word in said register means.

14. The system of claim 5 wherein said boundary words are received by said input means in the order in which the visible surfaces defined by said boundary words first appear in the scanning pattern of the display.

15. The system of claim 1 further having means responsive to the data representative of the surfaces for controlling selected segments of said scanning pattern of the display device, and update processing means connected between said display control means and said storage means for updating said data to be stored in said storage means for the next selected segment of said scanning pattern which said data controls.

16. The system of claim 15 wherein the updated data is stored in said storage means in the order in which said next selected segments appear in said scanning pattern of the display device.

17. The system of claim 15 wherein said update processing means includes test means for determining whether further selected segments of said scanning pattern are to be controlled by said data being tested, and said test means includes means for storing said data in said storage means only when further selected segments are to be controlled by that data.

18. A method for displaying images on a display comprising:

providing data representative of bounded areas of the image to be displayed, said data being defined in terms of the scanning pattern of the display, selecting the data in the order in which segments of the bounded areas appear in the image to be displayed according to the scanning pattern of the display, generating intensity control signals in response to the selected data, and storing said data representative of each bounded area of the image to be displayed for reuse in generating intensity control signals after the data has been initially used and until intensity control signals have been generated for all of the segments in which that bounded area appears.

19. The method of claim 18 wherein the providing of data representative of the bounded areas of the image to be displayed include providing said data in the order in which said bounded areas appear in the image to be displayed according to the scanning pattern of the display, and wherein the selecting of the data is between previously stored data and newly provided data.

20. The method of claim 18 further comprising updating the data for each bounded area before storage thereof for the next segment of that bounded area to appear in the image to be displayed.

21. The method of claim 18 wherein the providing of data representative of bounded areas of the image to be displayed includes supplying signals representative of a boundary edge and an intensity function of each bounded area in terms of the scanning pattern of the display.

22. The method of claim 21 wherein the scanning pattern display is a raster scan.

23. The method of claim 22 wherein the boundary edge is defined in terms of the raster scan by specifying the scan lines on which the boundary edge appears and the position of the boundary edge along those scan lines.

24. The method of claim 23 wherein the scan lines in which the boundary edge appears and the position of the boundary edge along those scan lines are provided by specifying the initial scan line in which the boundary edge appears, the position of that boundary edge along that scan line, the total number of scan lines in which the boundary edge appears and the incremental change in the position of the boundary edge along each successive scan line in which the boundary edge appears.

25. The method of claim 24 further comprising updating the data for each bounded area before storage thereof for the next segment of that bounded area to appear in the image to be displayed.

26. The method of claim 25 wherein the data is updated before storage by adding the incremental change in the position of the boundary edge along the next scan line to the present value of the position along the current scan line and by subtracting the value one from the total number of scan lines in which that bounded area is to appear.

27. The method of claim 26 wherein the data representative of the total number of scan lines in which the boundary edge is to appear is tested before the data is updated to determine whether intensity control signals for all of the segments in which that boundary edge is to appear have been generated.

28. The method of claim 18 wherein the intensity control signals generated include a plurality of intensity functions with respect to the scanning pattern of the display dependent on the selected data.

29. The method of claim 18 wherein the intensity control signals generated vary linearly with respect to the scanning pattern of the display.

30. The method of claim 18 wherein the intensity signals generated vary non-linearly with respect to the scanning pattern of the display.

31. The method of claim 18 wherein the intensity control signals generated are constant with respect to the scanning pattern of the display.

32. The method of claim 18 further including selectively overwriting the intensity control signals generated in response to selected data by providing intensity control signals which produce constant intensity for a predetermined portion of said scanning pattern of the display.

33. The method of claim 18 wherein the scanning pattern of the display is a raster scan.

34. A system for generating an image on a display comprising:

input means for receiving data representative of bounded areas of the image to be displayed;

storage means for storing the data received;

selecting means connected to said input means and said storage means for selecting from either of said means the data representative of the bounded area next to be displayed;

display control means connected to said selecting means for generating from said selecting means control signals responsive to the data transferred thereto; and display means connected to said display control means for receiving said control signals.

35. The system of claim 34 wherein said data is provided as a plurality of boundary words defining a boundary edge and an intensity function of the bounded area represented.

36. The system of claim 35 wherein said boundary words are transferred as a unit between the various means, and wherein the display control means includes a plurality of intensity function means for providing control signals in accordance with the intensity functions specified by each of said boundary words.

37. The system of claim 36 wherein the scanning pattern of said display means is a raster scan, and wherein the boundary words define said boundary edges by specifying the initial scan line and the beginning position along that scan line at which said bounded area begins and the incremental change in said position along succeeding scan lines.

38. The system of claim 37 wherein the intensity function is defined by specifying an initial intensity at said position along said initial scan line and the incremental change in said intensity with respect to succeeding scan lines and along each scan line.

39. The system of claim 37 further including update processing means connected between said display control means and said storage means for updating each of said boundary words for the next scan line, said update processing means including a first adding means for adding said incremental change in position along each scan line to the beginning position along the previous scan line and a second adding means for adding the incremental change in intensity with respect to successive scan lines to the intensity at the beginning position of the previous scan line.

40. The system of claim 34 wherein said display control means includes an overwrite means for providing control signals which produce a constant intensity output over a predetermined area of said display means regardless of other data received.

41. The method of displaying shaded perspective images on a raster scan display device comprising:

supplying data representative of areas of the image to be displayed in the order in which they first appear in the scanning pattern of the display device, storing previously supplied data representative of areas of the image to be displayed until the scan of the display device is beyond the area represented, choosing the data representative of the next area to be displayed from said newly supplied data and said stored data, and controlling the intensity of the display device in accordance with the chosen data.

42. The method of claim 41 wherein the data representative of areas of the image comprises a plurality of data words, each said word controlling the intensity of the display device over an area of the display device defined by that word.

43. The method of claim 42 wherein each of said data words specifies an intensity function for controlling the intensity of the display device and the portion of the raster scan in which that intensity function is to control the intensity of the display device.

44. The method of claim 42 wherein each of said data words specifies the beginning point of the raster scan where that data word is to commence control of the intensity of the display device and wherein once that beginning point is reached by the display scan that data word controls the intensity of the display device until the beginning point of the next selected data word is reached.

45. The method of claim 42 wherein each data word controls the intensity of the display device by specifying an intensity function which may be either linear, constant or non-linear with respect to the raster scan of the display device.

46. The method of claim 45 wherein the linear intensity function is defined by specifying the initial intensity at the first point of the scan controlled by that data word and the incremental change in intensity along each scan line and for successive scan lines and wherein the said incremental changes are added to said initial intensity value as the scan of the display device progresses.

47. The method of claim 42 wherein the area of the display device in which each data word controls the intensity of the display device is defined by specifying the edge of said area first encountered by the scan in the raster scan pattern.

48. The method of claim 47 wherein the edge of the area first encountered is defined by specifying the first scan line and the position along that scan line where the edge appears, the incremental change in position along the scan for successive scan lines and the total number of scan lines in which the edge appears.

49. The method of claim 48 further comprising comprising:

updating each data word before storing by adding the incremental change in the position along the scan line to the position along the preceeding scan line, and by reducing the total number of scan lines in which the edge appears by one.

50. The method of claim 49 further comprising checking the total number of scan lines in which the edge appears of each data word after each updating and discarding said word when the total number equals zero.

51. The method of claim 42 wherein the data words are supplied in series in the order in which said data words first control said display device, wherein said data words are stored in the order in which they are utilized, and wherein the data word defining the next area to be displayed is chosen by comparing the earliest stored data word with the currently supplied data word to determine which of the areas of the display device controlled by those two data words occurs first in the raster scan.

52. A method for generating an image of a bounded area on a raster scan display comprising the steps of:

providing data representative of the bounded area to be displayed, the data being defined in terms of the raster pattern;

generating intensity control signals for a first raster line upon which the bounded area first appears in response to the selected data;

updating the data for a subsequent raster line of the display;

storing the updated data; and generating intensity control signals for the subsequent raster line in response to the stored updated data.

53. The method of claim 52 wherein the data defines boundary edges of the bounded area by specifying the initial scan line (Yo) in which each boundary edge appears, the last scan line (Yc) in which each boundary edge appears, the initial position along the initial scan line at which the boundary edge appears (Xo), and the incremental change in position of each boundary edge along each scan line with respect to a change from one scan line to the next ($\Delta X/\Delta Y$).

54. The method of claim 53 wherein the data is updated between the initial and last scan line by adding the incremental change in position of the boundary edge to the initial position of the boundary edge for each scan line subsequent to the initial scan line.

* * * * *